(12) United States Patent
Roberts

(10) Patent No.: US 8,931,752 B2
(45) Date of Patent: Jan. 13, 2015

(54) MODULAR BOAT HULL MOLDS AND METHOD OF MAKING BOAT HULLS USING SAME

(76) Inventor: Wallace Martin Roberts, Conception Bay South (CA)

(*) Notice: Subject to any disclaimer, the term of this patent is extended or adjusted under 35 U.S.C. 154(b) by 610 days.

(21) Appl. No.: 12/889,151

(22) Filed: Sep. 23, 2010

(65) Prior Publication Data

US 2012/0073489 A1   Mar. 29, 2012

(51) Int. Cl.
*B29C 33/30* (2006.01)
*B29C 33/38* (2006.01)
*B63B 9/06* (2006.01)
*B63B 3/04* (2006.01)
*B29L 31/30* (2006.01)

(52) U.S. Cl.
CPC .................. *B63B 9/06* (2013.01); *B29C 33/305* (2013.01); *B29C 33/3835* (2013.01); *B29C 33/3857* (2013.01); *B29C 33/3892* (2013.01); *B29C 33/3842* (2013.01); *B29C 33/301* (2013.01); *B29L 2031/307* (2013.01); *B63B 3/04* (2013.01)
USPC ............................ 249/156; 249/162; 249/169

(58) Field of Classification Search
CPC   B29C 33/301; B29C 33/305; B29C 33/3842; B29C 33/385; B29C 33/3857; B29C 33/3892; B29L 2031/307; B63B 3/02
USPC .................. 249/156–164, 168–169; 425/470; 156/245; 264/219; 29/469
See application file for complete search history.

(56) References Cited

U.S. PATENT DOCUMENTS

| | | | | |
|---|---|---|---|---|
| 1,106,627 A * | 8/1914 | Cornelius | ....................... | 249/14 |
| 2,416,559 A * | 2/1947 | Wilson | .............................. | 249/16 |
| 3,072,929 A * | 1/1963 | Skoggard | ....................... | 114/357 |
| 3,148,652 A | 9/1964 | Canazzi | | |
| 3,690,801 A * | 9/1972 | Hutz et al. | ..................... | 425/229 |
| 3,806,304 A * | 4/1974 | Tighe | .............................. | 425/470 |
| 3,811,141 A * | 5/1974 | Stoeberl | ......................... | 114/357 |
| 3,827,666 A * | 8/1974 | Dreher | ............................ | 249/18 |
| 3,960,998 A * | 6/1976 | Allen | ............................ | 264/45.1 |

(Continued)

FOREIGN PATENT DOCUMENTS

| | | | | |
|---|---|---|---|---|
| CH | | 675103 A5 * | 8/1990 | ............... B29D 9/00 |
| DE | | 3519279 | 12/1986 | |

(Continued)

OTHER PUBLICATIONS

PCT International Search Report PCT/CA2011/001431. Completed Sep. 10, 2012. Mailed Sep. 12, 2012.

*Primary Examiner* — Dimple Bodawala

(57) ABSTRACT

The present invention generally provides mold modules for constructing boat hulls, methods of constructing boat hulls using the mold modules, and hulls constructed using the mold modules. The modules may be adjustable, and may be included in a kit for building the hull of many boats of different dimensions but generally the same shape. Each mold module generally comprises a mold in a shape complementary to that of a portion of a boat hull, and an edge mold to form the edge of the hull part formed by that mold module. A mold module according to the present invention may also comprise one or more mold adjustment areas, and calibrators for selecting the boat hull dimensions. Methods for using the aforementioned mold modules generally comprise steps of molding hull parts, removing them from the mold modules, aligning them and finally attaching them together.

17 Claims, 25 Drawing Sheets

(56) References Cited

U.S. PATENT DOCUMENTS

| | | | |
|---|---|---|---|
| 4,073,049 A * | 2/1978 | Lint | 29/458 |
| 4,120,632 A | 10/1978 | Stoeberl | |
| 4,179,093 A * | 12/1979 | Western | 249/65 |
| 4,228,985 A * | 10/1980 | Gaudelli et al. | 249/93 |
| 4,303,707 A * | 12/1981 | Prior | 427/397 |
| 4,695,032 A | 9/1987 | Desport | |
| 5,036,788 A * | 8/1991 | Unger | 114/355 |
| 5,106,282 A * | 4/1992 | Sullivan, Sr. | 425/112 |
| 5,242,523 A | 9/1993 | Willden et al. | |
| 5,433,165 A | 7/1995 | McGuiness et al. | |
| 5,445,099 A | 8/1995 | Rendina | |
| 5,875,732 A | 3/1999 | Chapman et al. | |
| 6,168,358 B1 * | 1/2001 | Engwall et al. | 409/219 |
| 6,197,146 B1 * | 3/2001 | Sucic et al. | 156/245 |
| 6,338,308 B1 | 1/2002 | Becker et al. | |
| 6,517,760 B1 * | 2/2003 | Lazzara | 264/219 |
| 6,723,272 B2 | 4/2004 | Montague et al. | |
| 7,112,299 B2 * | 9/2006 | Merrick | 264/510 |
| 7,418,915 B2 | 9/2008 | Campbell | |
| 8,025,493 B2 * | 9/2011 | Petrov | 425/3 |
| 2002/0000506 A1 * | 1/2002 | Khoo | 249/18 |
| 2003/0056887 A1 * | 3/2003 | Sicola | 156/212 |

FOREIGN PATENT DOCUMENTS

| | | | |
|---|---|---|---|
| GB | 2390573 | 1/2004 | |
| JP | 1233190 | 9/1989 | |
| SU | 1152865 A * | 4/1985 | B63B 9/00 |
| WO | WO 87/00483 A1 * | 1/1987 | B29C 45/13 |
| WO | 2006094114 A2 | 9/2006 | |
| WO | WO 2008/034169 A1 * | 3/2008 | B63B 1/06 |

* cited by examiner

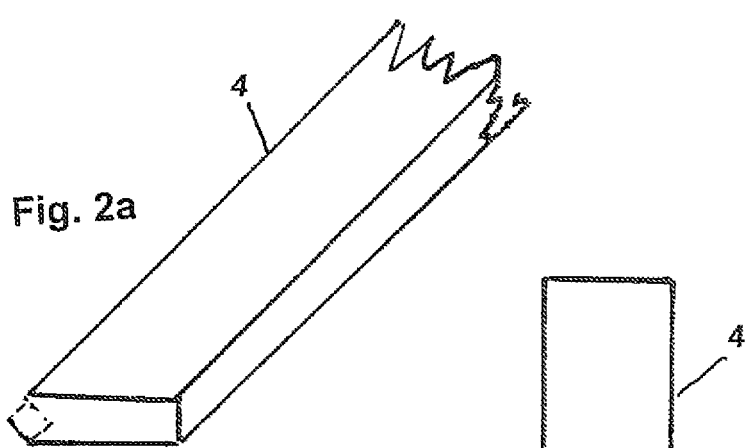
Fig. 2a
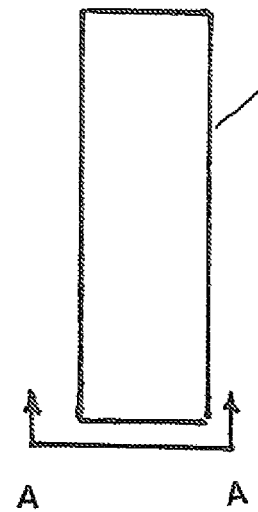
Fig. 2b
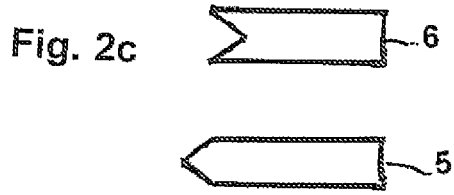
A-A Female
Fig. 2c
A-A Male
Fig. 2d

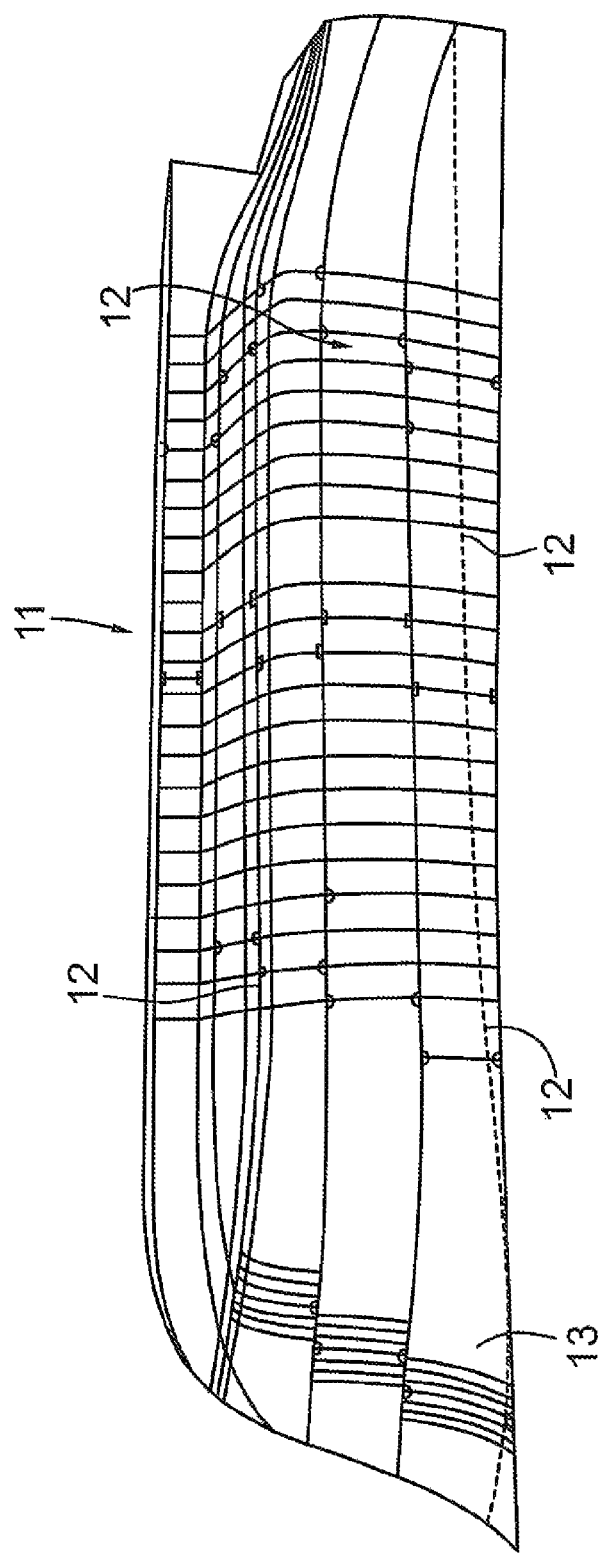

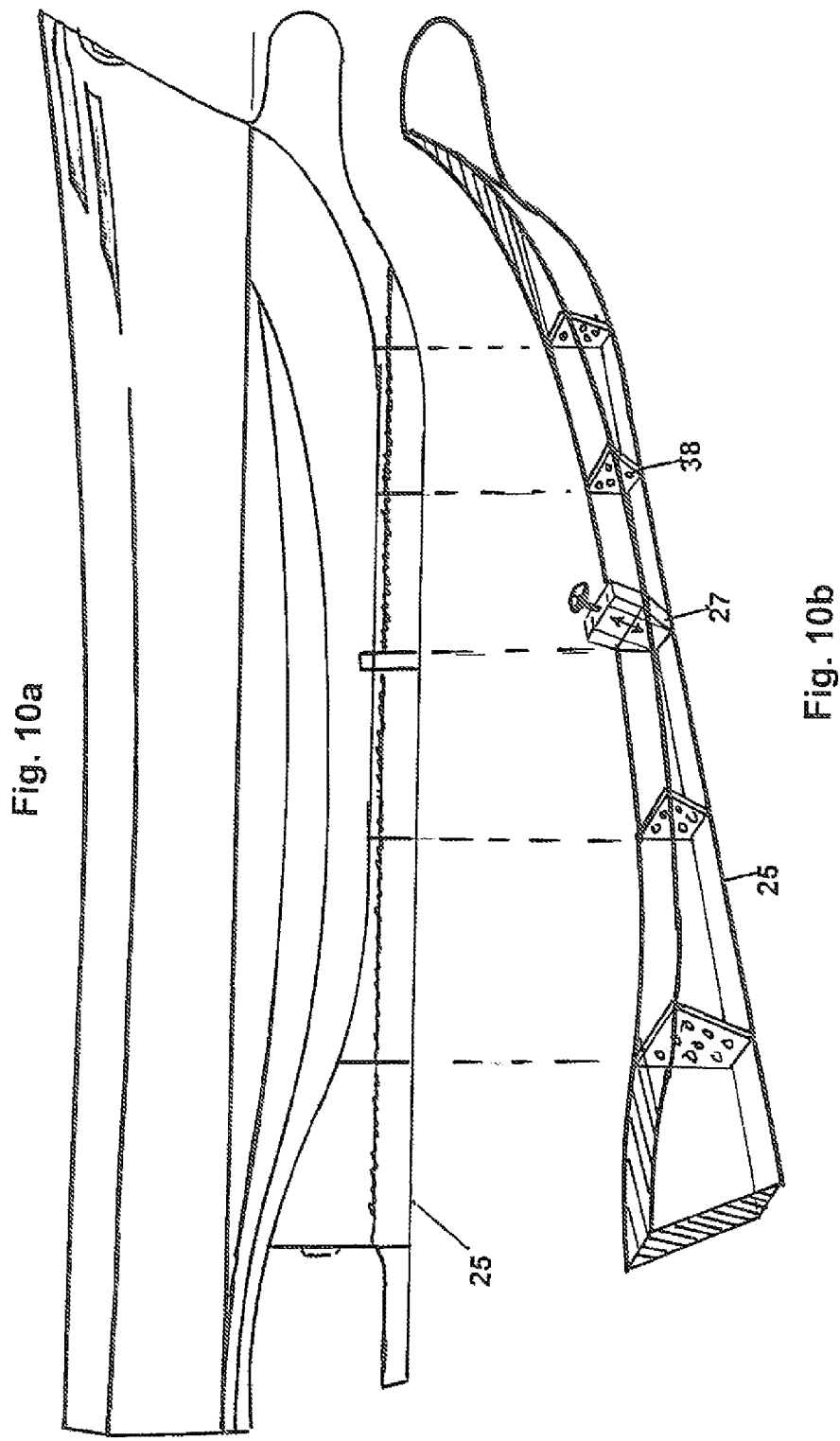

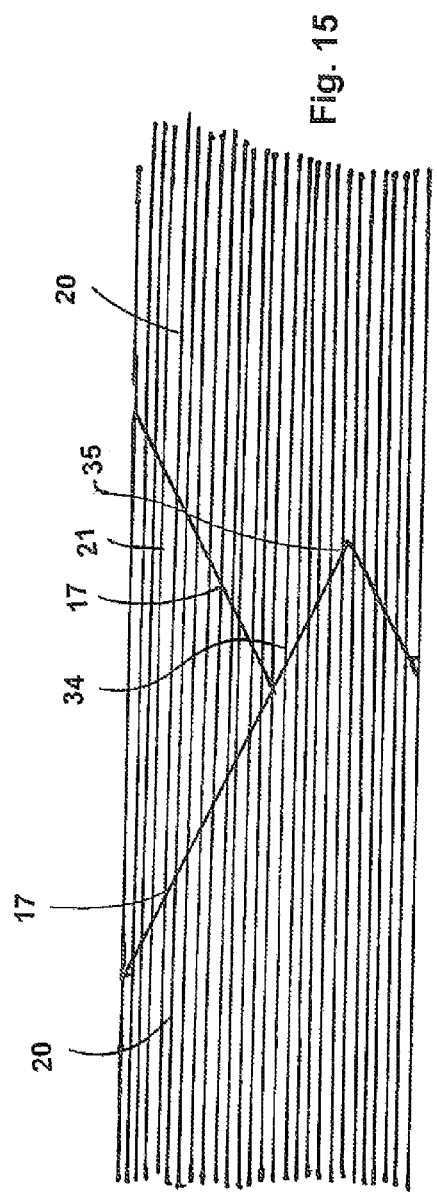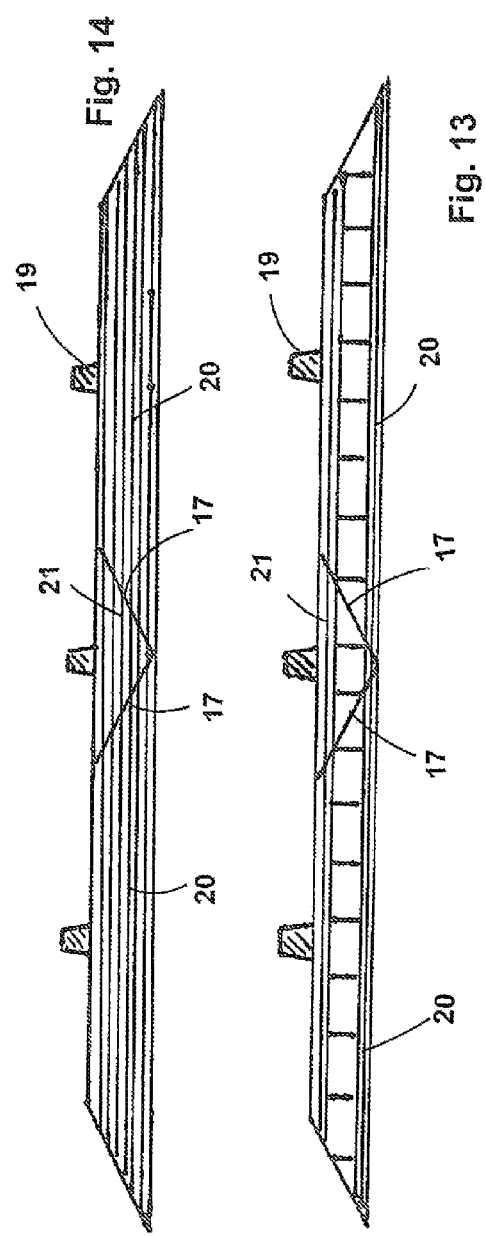

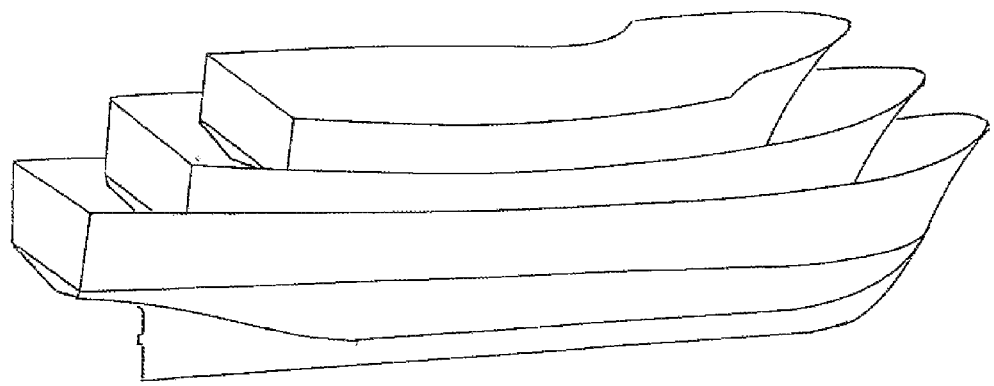
19c
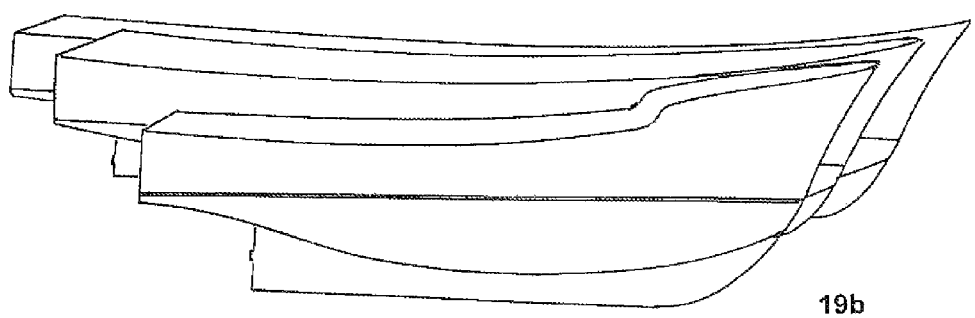
19b
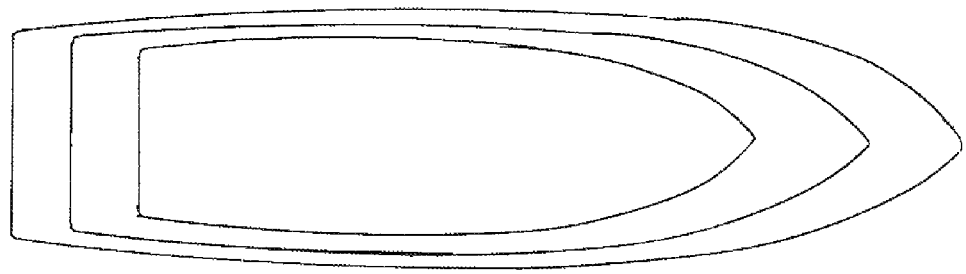
19a
Fig. 19

MODULAR BOAT HULL MOLDS AND METHOD OF MAKING BOAT HULLS USING SAME

FIELD OF THE INVENTION

The present invention is directed towards hull molds and in particular modular adjustable molds for constructing boat hulls, and methods of constructing boat hulls using the adjustable molds.

BACKGROUND OF THE INVENTION

During the construction of a boat, often a mold is used to create a composite hull. Single, two and three part female molds, used to build a hull of one set size and shape, are well known in the boat building industry. The single or unit mold is most suitable for a small boat; a two part mold, often split down the longitudinal center, is suitable for a larger boat as it makes the composite layup and demolding process easier; and a three part mold, with two sides and a transom, allows for scaffolding to reach the work surface. Conventional single, two or three part hull molds can only be used to create a hull of one size and shape; this is because the size and shape of the hull plug is transferred to the mold upon its construction, and subsequently to the final hull, with fixed results.

A problem long experienced by composite boat builders is that it is costly and sometimes impossible to change a mold to produce hulls of substantially different dimensions. Further, once changes are made to a mold, the ability to revert back to the original size is not possible without costly additional expenditures. One solution to this problem is to build or purchase a new mold for each desired hull shape and size; however, the process of building or purchasing a new mold is time consuming and expensive, and represents a major investment for most shipyards.

Another common problem with current molds is that they are often quite large and heavy, to facilitate the construction of large boat hulls. This causes them to take up large amounts of room in storage, and causes transport and disposal to be slow and expensive.

The size of molds used to create large boat hulls is often inhibitory to the construction process. During the construction of large hull boats, conventional boat hull construction techniques cannot be undertaken at work bench level. This causes resin drainage due to the vertical surface nature of conventional boat hull molds, resulting in resin rich and resin lean areas that weaken the laminate.

U.S. Pat. No. 5,875,732 describes a method for boat hull construction using a mold. The discussed mold is an example of a commonly used single part female mold, and the process to create the mold involves placing material in the mold and curing it. If used to construct a large boat hull, this mold suffers the aforementioned cost, configurability and resin drainage issues. Other variants of this method have the same issues; WO2006094114A2 is a similar process which replaces composite layup with injection molding, U.S. Pat. No. 6,723,272 describes stretching a membrane over the curing material in the female mold, U.S. Pat. Nos. 5,433,165 and 4,120,632 have male and female surfaces which sandwich the curing material. All of these methods of creating boat hulls contain a standard single, double or triple part female mold, and as such the foregoing discussion applies to them.

U.S. Pat. No. 4,695,032 discloses a convertible mold, which may be used to create boat hulls of different shapes. The mold disclosed in this document comprises a frame including bars and beams carrying movable heads supporting a lattice of slats. In order to configure this mold, one must adjust the frame structure to move the slats such that they form the female mold of the desired hull shape. Not only is this design expensive and complex, it suffers many of the same disadvantages of the other molds known in the art: it takes up large amounts of space, and its vertical walls cause resin drainage.

Therefore, it would be advantageous to provide a boat hull mold which solves the aforementioned problems.

SUMMARY OF THE INVENTION

The present invention generally provides a kit for building the hull of a boat, comprising a plurality of mold modules each for constructing a portion of a hull of a boat, each mold module comprising:
  a panel mold in a shape complementary to that of a portion of a pre-selected hull shape, for receiving hull material thereby forming the hull material into a hull part; and
  at least one movable edge mold disposed on said panel mold for forming an edge of the hull part such that a plurality of said hull parts may be aligned with one another at their edges;
  wherein the set of mold modules create a set of hull parts which are attachable to form at least a portion of the hull of a boat.

Further, the present invention generally provides a mold module for constructing a portion of a hull of a boat, comprising
  a panel mold in a shape complementary to that of a portion of a pre-selected hull shape, for receiving hull material thereby forming the hull material into a hull part; and
  at least one movable edge mold disposed on said panel mold for forming an edge of the hull part such that a plurality of said hull parts may be aligned with one another at their edges.

In an embodiment of the invention, the panel mold further comprises at least one mold adjustment area integrally formed with the panel mold and extending from at least a portion of the outer perimeter of the panel mold for adjusting at least one dimension of said hull shape.

In another embodiment of the invention, the mold module further includes a calibrator comprising settings for selecting a magnitude of said at least one dimension. These settings may comprise markings denoting the magnitude of at least one dimension of said hull shape. This dimension may be one of length, width, depth, or combination thereof.

In another embodiment of the invention, the mold module includes a flange around its perimeter. The calibrator may be located on this flange.

In an embodiment of the invention, the at least one movable edge mold is movable to and between a number of positions within the mold adjustment area, wherein the positions correspond to the settings of the calibrator. The at least one movable edge mold may define at least a portion of the perimeter of the hull part, and may be a plurality of edge moldes that define the complete perimeter of the hull part. The at least one movable edge mold may comprise a key-lock surface, the key-lock surface comprising either a male surface or a female surface, wherein an edge of said hull part formed on the male surface fits in registration with an edge of another hull part formed on said female surface.

In an embodiment of the invention, the hull part made by the mold module of the present invention is substantially rectangular. In a further embodiment, the length of the perimeter is less than or equal to 12 meters, and the width is less than or equal to 3 meters.

In another embodiment of the invention, the shape of the hull is one of full displacement, semi-displacement, light displacement, planning and multi-hull, swath-hull and submarine hull form.

The present invention generally provides a hull of a boat having a port portion and starboard portion, each portion comprising a plurality of composite hull parts joined together with joining material. The shape of the hull may be one of full displacement, semi-displacement, light displacement, planning and multi-hull, swath-hull and submarine hull form.

The present invention also generally provides a method of constructing a hull of a boat, comprising the steps of:
a) molding hull material in a mold module, and at least partially curing the hull material to form a hull part;
b) removing the hull part from the mold module and placing the hull part in an alignment jig;
c) aligning a plurality of said hull parts; and
d) attaching the plurality of hull parts together to form a hull.

In an embodiment of the invention, the method further comprises adjusting the mold module to select a desired hull size prior to the molding step. This adjusting step may comprise moving at least one movable edge mold within an adjustment area on the mold module. The at least one edge mold may be moved to form at least a portion of the perimeter of a hull part, and may be moved to form the complete perimeter of a hull part.

In an embodiment of the invention, the molding step further comprises molding the hull material in the edge mold.

Further, in an embodiment of the invention, the attaching step comprises molding joint material such that the joint material contacts a plurality of hull parts, and curing the joint material.

In an embodiment of the invention, the hull material molding step forms a taper at a portion of the boundary of the hull part, and joint material is molded in registration with a valley formed by the tapers when a plurality of hull parts are aligned, such that the joint material contacts a plurality of hull parts, and curing the joint material.

In some embodiments of the invention, the hull material is one of solid glass, cored (sandwich) construction, Kevlar, carbon fibre, and combination thereof, and the joint material is one of solid glass, cored construction, Kevlar, carbon fibre, ceramics, composite casting and combination thereof. The hull material and the joint material may be the same material.

In an embodiment of the invention, the method may further comprise the step of attaching a hat stringer to the hull material.

In an embodiment of the invention, the aligning step comprises applying an adhesive to a portion of each of the plurality of hull parts and moving the hull parts together such that the portions with applied adhesive come into contact.

In some embodiments of the invention, the molding step comprises one of hand layup, mechanical layup, vacuum bagging, resin infusion, vacuum assisted resin infusion, closed molding system, high-tech prepreg layup, filament winding, ceramic molding and combination thereof.

The present invention generally provides a stabilizer keel having a fore and an aft comprising a hollow portion extending longitudinally therethrough and partially filled with ballast, and a fluid controller for controlling a motion of the ballast in the hollow portion. The fluid controller, in some embodiments, comprises one of a valve, a plurality of baffle bulkheads, a water jet, a pump, and combination thereof. In some embodiments, the fluid controller comprises a seastate sensor and controls said motion of said ballast autonomously.

In some embodiments of the invention,
the fluid controller controls said motion of the ballast to be directed towards the fore of the stabilizer keel and to have a pre-selected flow rate when the fore of the stabilizer keel is lower than the aft of the stabilizer keel; and
the fluid controller controls the motion of the ballast to be directed towards the aft of the stabilizer keel and to have a pre-selected flow rate when the aft of the stabilizer keel is lower than the fore of the stabilizer keel;
wherein a pitching motion of the stabilizer keel is damped by the motion of the ballast.

The present invention further provides a hull of a boat having a fore and aft, comprising
a starboard chine keel disposed on its starboard side; and
a port chine keel disposed on its port side; wherein
each chine keel is shaped to generate lift by applying a force on adjacent fluid flowing with an upward velocity component such that the upward velocity component is reduced.

In some embodiments of the invention, the starboard chine keel and the port chine keel each comprise a hollow portion extending longitudinally therethrough and are each partially filled with ballast. In some embodiments, each chine keel further comprises a fluid controller for controlling a motion of the ballast in the hollow portion. This fluid controller, in some embodiments of the invention, comprises one of a valve, a plurality of baffle bulkheads, a water jet, a pump, and combination thereof. Further, in some embodiments of the invention, the fluid controller comprises a seastate sensor and controls said motion of said ballast autonomously.

In an embodiment of the invention, each chine keel is shaped to entrap air below the hull and direct the air to lubricate the bottom of the hull.

In another embodiment of the invention, each chine keel extends longitudinally along the hull and is generally triangular in shape.

A further understanding of the functional and advantageous aspects of the invention can be realized by reference to the following detailed description and drawings.

BRIEF DESCRIPTIONS OF THE DRAWINGS

FIG. 2 is an embodiment of the edge mold of the present invention, and shows the a) perspective, b) top, c) female cross sectional and d) male cross sectional views thereof.

FIG. 4 is a perspective view of the starboard side and bottom of a modularized 120 ft. full displacement hull plug showing width and length adjustment areas according to an embodiment of the invention.

FIG. 10a is a side view of the boat shown in FIG. 8, with the stabilizer keel of the present invention.

FIG. 10b is a perspective view of the stabilizer keel of the present invention, showing the top and side of the valve and baffle bulkhead fluid controllers.

FIG. 13 is a view of two composite reinforced sandwich construction hull parts joined to one another with joining material.

FIG. 14 shows two solid composite hull parts joined to one another with joining material.

FIG. 15 is a close up of the joining material and key-lock surface at the edge of each hull part used for alignment.

FIG. 19 shows the a) top, b) side, and c) perspective view of multiple boat hulls of different sizes but generally the same shape, which may be created from one mold module kit of the present invention.

DETAILED DESCRIPTION OF THE INVENTION

The systems described herein are directed, in general, to hull molds and in particular modular adjustable molds for constructing boat hulls, and methods of constructing boat hulls using the adjustable molds. Although embodiments of the present invention are disclosed herein, the disclosed embodiments are merely exemplary and it should be understood that the invention relates to many alternative forms, including different shapes and sizes. Furthermore, the Figures are not drawn to scale and some features may be exaggerated or minimized to show details of particular features while related elements may have been eliminated to prevent obscuring novel aspects. Therefore, specific structural and functional details disclosed herein are not to be interpreted as limiting but merely as a basis for the claims and as a representative basis for enabling someone skilled in the art to employ the present invention in a variety of manner. For purposes of instruction and not limitation, the illustrated embodiments are all directed to hull molds and in particular modular adjustable molds for constructing boat hulls, and methods of constructing boat hulls using the adjustable molds.

As used herein, the terms "comprises", "comprising", "includes" and "including" are to be construed as being inclusive and open ended, and not exclusive. Specifically, when used in this specification including claims, the terms "comprises", "comprising", "includes" and "including" and variations thereof mean the specified features, steps or components are included. These terms are not to be interpreted to exclude the presence of other features, steps or components.

As used herein, the terms "about" and "approximately", when used in conjunction with ranges of dimensions, compositions of mixtures or other physical properties or characteristics, is meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present invention.

As used herein, the coordinating conjunction "and/or" is meant to be a selection between a logical disjunction and a logical conjunction of the adjacent words, phrases, or clauses. Specifically, the phrase "X and/or Y" is meant to be interpreted as "one or both of X and Y" wherein X and Y are any word, phrase, or clause.

Figure 1:
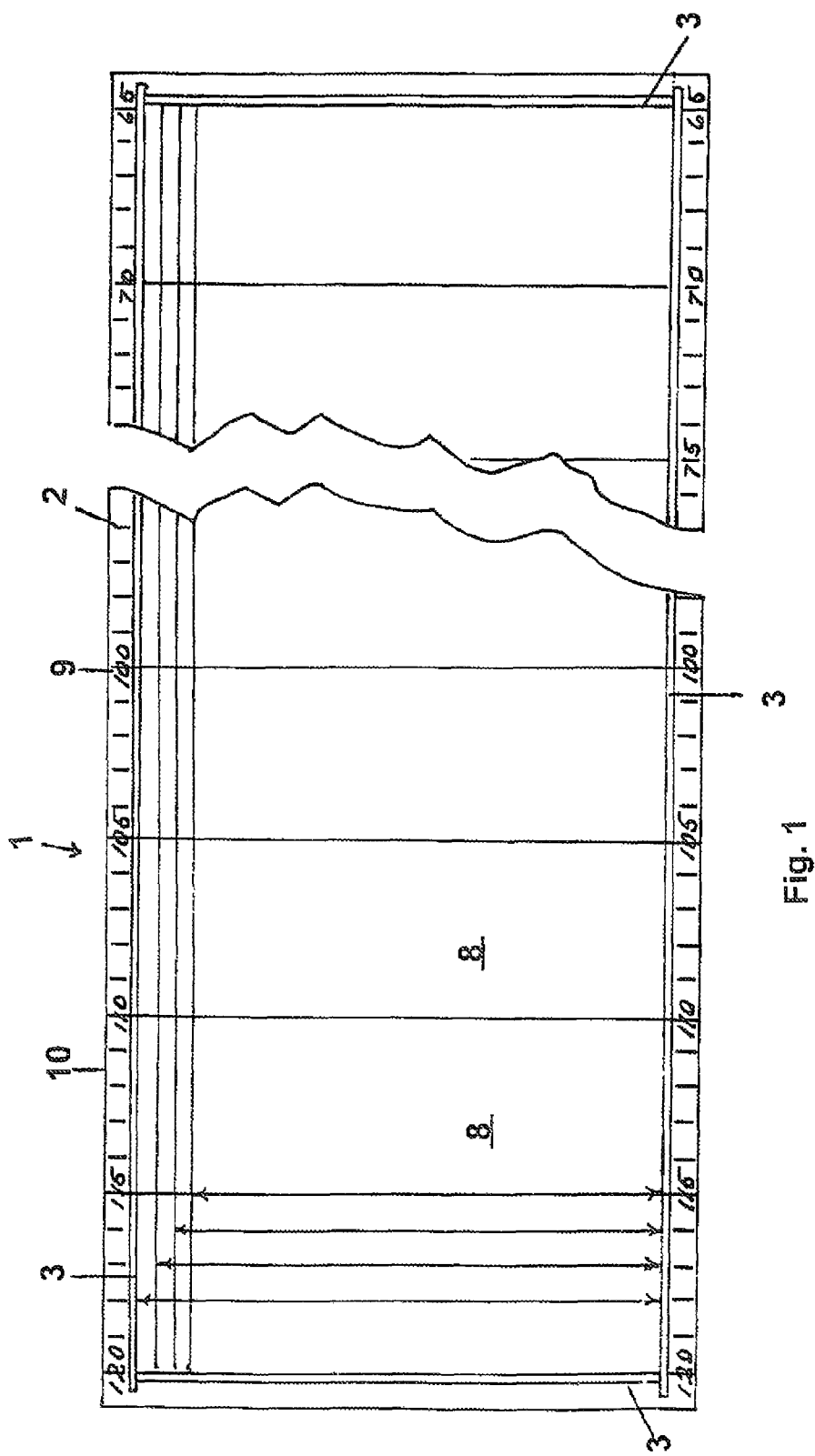
FIG. 1 is a top view showing an embodiment of a mold module of the present invention, the mold modules having a flange and both length and width adjustment demarcations and four metal gauge bars in place, ready for hull part lay-up.

The mold module 1 of the present invention is shown generally in FIG. 1. The mold module 1 preferably has a panel mold 2, which is a surface shaped complementary to that of a desired hull shape. The complementary shape of the panel mold 2 is a shape such that when moldable material is placed in and conforms to the panel mold 2, it forms the shape of a portion of a boat hull. The panel mold 2 may be made from any material known in the art suitable for acting as a mold for a given hull material; as an illustrative example, not intended to limit the invention, a composite may be used to create the panel mold 2 when the intended hull material is also a composite.

Further, the mold module 1 preferably also includes an edge mold 3 disposed on the panel mold 2. When hull material is placed in the mold module 1 to form a hull part 20, the edge mold 3 forms the edges of the hull part 20 such that it may be aligned with other hull parts 20 at their edges. In some embodiments, the edge mold 3 is movable on the panel mold 2. Edge molds 3 that are movable may be permanently attached to the panel mold, for example those which move constrained to a track; or they may be removable entirely and just be placed on the panel mold 2 when and where they are required to form the edges of a hull part 20. Further, the mold module 1 may have multiple edge molds 3. Similarly to the panel mold 2, the edge mold 3 may be made from any material known in the art suitable for acting as a mold for a given hull material.

In the exemplary embodiment of the invention shown in FIG. 1, the edge mold 3 is a bar which may be moved and/or removed from the panel mold 2. A more detailed view of the edge mold bar 3 is shown generally in FIG. 2. This bar contains a key-lock surface 4, being either a male or female surface 5, 6. The male and female surfaces 5,6 form the hull material in the mold module 1 such that the molded hull parts 20 may be aligned with one another at their edges. In this illustrative embodiment, the key-lock surface 4 is of generally triangular cross section, where a bar 3 with a male key-lock surface 5 is a bar with a triangular piece added to the cross section, and a bar 3 with a female key-lock surface 6 is a bar with a triangular piece removed from the cross section. This is merely an exemplary embodiment, as the male and female key-lock surfaces 5,6 may not be triangular; they may be of any shape such that the male key-lock surface 5 molds an edge of a hull part 20 that fits in registration with an edge of a hull part 20 molded by a female key-lock surface 6.

Referring to FIG. 1, preferably when the edge mold bar 3 is placed on the panel mold 2, the key-lock surface 4 shown in FIG. 2 faces the region where hull material will be placed. In some embodiments of the invention, an edge mold bar 3 with a male key-lock surface 5 will be placed at the forward end (as defined by the created hull part 20's orientation in the completed hull) of the module, and an edge mold bar 3 with a female key-lock surface 6 will be placed at the aft end. Similarly, in some embodiments of the invention, an edge mold bar 3 with a male key-lock surface 5 will be placed at the upper end (as defined by the created hull part 20's orientation in the completed hull) of the module, and an edge mold bar 3 with a female key-lock surface 6 will be placed at the lower end. However, both of these arrangements may be switched.

Further, one or more general edge molds 3 of the present invention may be placed on the panel mold 2 to define a portion of or the complete perimeter of the molded hull part 20. As an example, in FIG. 1 there are 4 edge molds 3, and they form the complete perimeter of a hull part 20 with a rectangular perimeter. Other embodiments of mold modules 1 may have more or fewer edge molds 3, and these edge molds 3 may define an incomplete portion of the perimeter of a hull part 20. This is useful, for example, when molding a hull part 20 containing the sheer-line of a hull, where depth adjustments and the curve shape of the sheer-line require a free sheer-line surface to meet builders or buyers individual sheer-line profile preferences.

Figure 3:
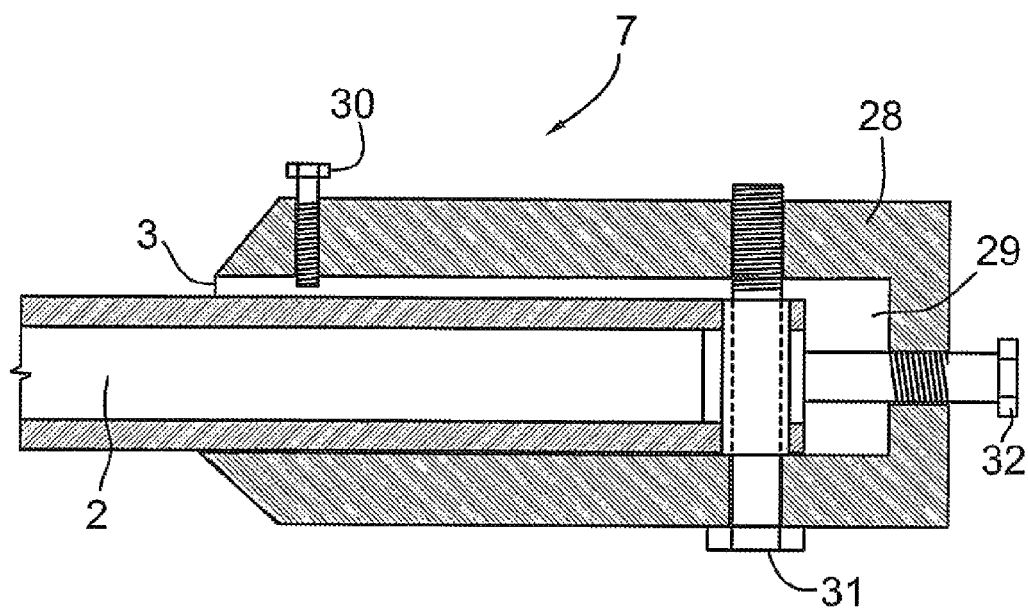
FIG. 3 is a cross section view of a three way adjustable gauge bar clamp for holding an edge mold of the present invention in place.

Referring now to FIG. 3, an edge mold 3 may be secured to the panel mold 2 using a clamp 7. In embodiments where the edge mold 3 is movable, this may be useful for providing temporary fixation between the edge mold 3 and the panel mold 2, for example, during the construction of some hull parts 20. The exemplary embodiment of a clamp 7 shown in FIG. 3 comprises a c-shaped portion 28 with a slot 29 able to accept the end of a mold module 1 including an edge mold 3. This slot grips the edge mold 3 such that it is firmly secured on a surface of the mold module 1. In this embodiment, the strength of the gripping action of the clamp 7 may be adjusted by three adjustment bolts 30, 31, 32, including a bolt 30 which secures the edge mold 3, a bolt 31 which tightens opposing sides of the c-shaped portion 28, and a bolt 32 which engages the edge of the mold module 1. Other means may be used to secure the edge mold 3 to the panel mold 2, such as, but not limited to, grooves in the mold module 1 to fit in registration with a portion of the edge mold 3 or tracks.

The mold module 1 according to the present invention preferably includes one or more mold adjustment areas 8, shown in FIG. 1. Preferably, the mold adjustment areas 8 are integrally formed with the panel mold 2 and extend from at least a portion of the outer perimeter of the panel mold 2. Further, preferably the mold adjustment areas 8 are shaped complementary to a portion of a hull shape. When molding hull material in the mold module 1, hull material may optionally also be placed in the mold adjustment area 8, allowing one mold module 1 to create hull parts 20 which form hulls of different sizes. The mold adjustment areas 8 are preferably made of the same material as the panel mold 2.

The mold module 1 according to the present invention preferably includes a calibrator 9 which has settings for allowing the independent selection of the multiple dimensions of the hull formed by the hull parts 20. In the exemplary embodiment of the invention shown in FIG. 1, the calibrator 9 comprises markings on the mold module 1 which denote the regions on the mold adjustment areas 8 where hull material must be placed to form a hull of the dimensions denoted by the markings. In this embodiment the markings 9 denote the dimensions of length and width, but generally these markings 9 may denote any common hull shape parameters in the art of hull construction. Furthermore, the calibrator 9 of the present invention need not comprise written symbols; it may include a colour coding system, a system of grooves, magnets, or any other means of allowing the selection of the size of the hull created from the molded hull part 20.

The mold module 1 of the present invention may include a flange 10 around its perimeter. The flange 10 serves a number of purposes: it may provide support space for vacuum bagging attachment, vacuum assisted resin infusion and other closed molding processes for use with the mold module 1; and it may also provide a surface for locating the calibrator 9 such that hull material does not cover the calibrator 9 during molding. In the embodiment shown in FIG. 1, the flange 10 is of rectangular shape with a width of 6 or 7 inches, and contains the calibrator markings 9. In this embodiment, the flange 10 is an extension of the material of the mold module 1 and is integrally formed therewith. Persons skilled in the art will appreciate that the flange may be of other shapes and dimensions suitable for the aforementioned purposes.

In an embodiment of the invention, the edge molds 3 are movable to and between a number of positions in the mold adjustment area 8, where these positions preferably correspond to the settings of the calibrator 9. Once the edge molds 3 are moved to one of the positions, they may be secured in place to ready them for the molding procedure.

Referring to FIG. 4, shown is a plug 11 of a hull of a boat for forming therefrom molds to form therefrom molded hull parts. Some of the dividing lines on plug 11 of FIG. 4 indicate the size and shape of molds formed based on plug 11. Furthermore, other lines on plug 11 of FIG. 4 indicate the configurable sizes of the molded hull parts made from the molds formed based on plug 11. Each molded hull part should nest tightly upon the plug at its respective location. As is shown in FIG. 4, some curved molded hull parts in the form of hull parts that are other than flat, such as a first resulting hull part associated with hull part 13 of plug 11, are configurable, typically during molding thereof. Hull part 13 of plug 11 is shown to have different supported lengths (from aft to fore of the boat). The areas delineated between vertical stripes in FIG. 4 define mold adjustment areas, and each represent an additional length to add to a part molded for hull part 13 or an adjacent nose hull part allowing hull part 13 to include up to 3 adjustment areas along its length. The nose of the boat has a given width and when molded is also extensible by up to 3 mold adjustment areas.

During molding of panels, for example, 2 mold adjustment areas are included in the first resulting hull part. A boat made with the first resulting hull part will have an opening for a nose thereof that is widest relative to the boat width and, as such, a wider nose is accommodated relative to the boat width than when the first resulting hull part includes all 3 mold adjustment areas resulting in a narrower opening relative to the overall boat width. In the embodiment shown with reference to FIG. 4a, the mold adjustment areas are used symmetrically such that addition of one mold adjustment area to the first resulting hull part is accompanied by addition of one mold adjustment area to the nose hull part for being abutted adjacent the mold adjustment area of first resulting hull part. Addition of two mold adjustment areas to the first resulting hull part is accompanied by addition of two mold adjustment areas to the nose hull part for being abutted adjacent the mold adjustment area of first resulting hull part. All of these adjustments to the hull parts are performed during molding thereof and though they are described relative to the plug, the plug is not being changed, it is a boat molded based on the plug that is configurable in at least one of length and width.

As the boat width for a boat under manufacture is increased from a minimum supported width to a maximum supported width—mold adjustment areas on the bottom of the boat are included in those hull parts along the bottom—mold adjustment areas are included in molding of the first resulting hull part and the hull part of the nose for being disposed adjacent the first resulting hull part to ensure that the nose of the boat fits the opening correctly resulting in a smooth surface transition from nose portion to side portion of the boat via curved portion of the first resulting hull part. Alternatively, as the hull parts on the bottom of the boat are manufactured without mold adjustment areas included—the boat is narrower— mold adjustment areas are not included during molding of the first resulting hull part and the nose hull part for being disposed adjacent the first resulting hull part to result in a wider opening at the front of the boat (absent the nose) relative to the boat width allowing for the nose hull part molded with a same configurable mold to append to the boat with a smooth transition therebetween. Therefore, different molds for nose hull parts for supporting different boat widths is obviated.

Figure 4A:
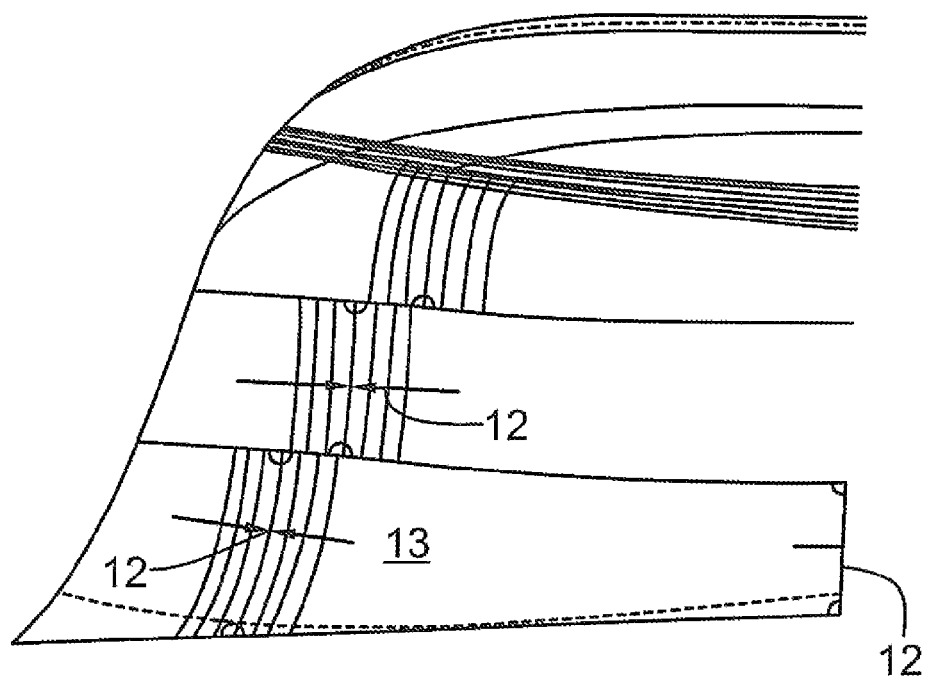
FIG. 4a is an enlarged perspective view of the bow section of FIG. 4 showing three vertical width adjustment areas and part of the longitudinal and width adjustment areas and serial numbering of modules.
Figure 4B:
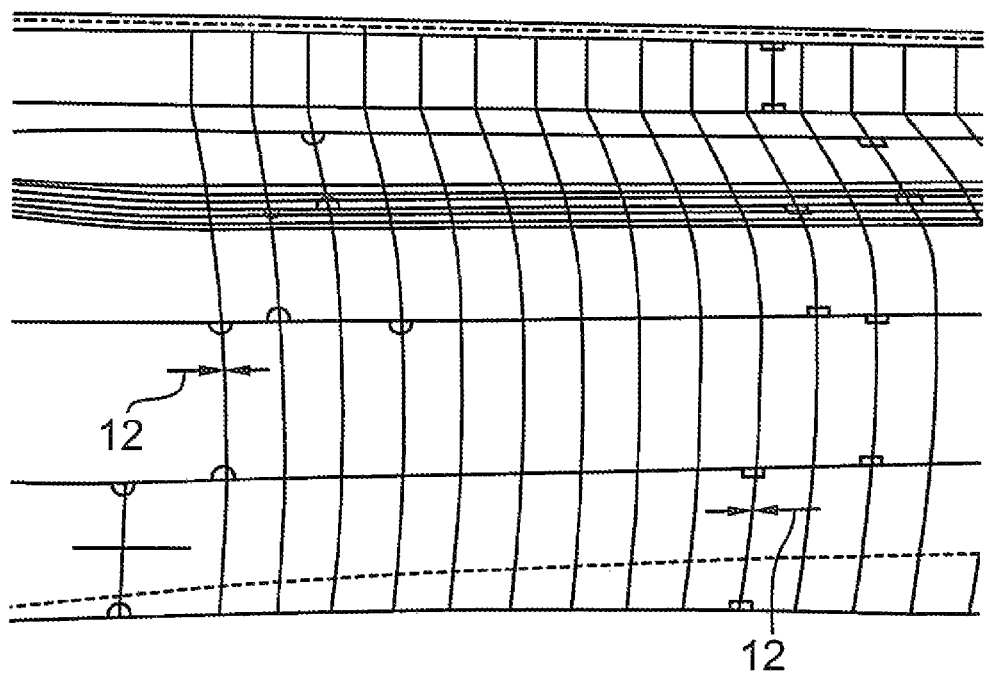
FIG. 4b is an enlarged perspective view of the mid-body section of FIG. 4 showing a continuation of the longitudinal and width adjustment areas and serial numbering of modules.
Figure 4C:
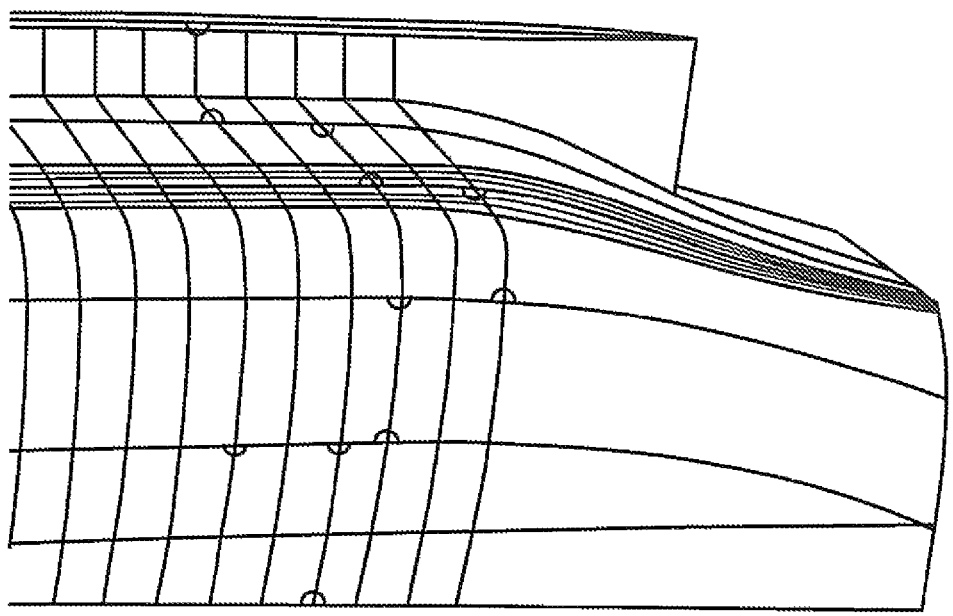
FIG. 4c is an enlarged perspective view of the stern section of FIG. 4 showing a continuation of the longitudinal and width adjustment areas and serial numbering of modules.
Figure 4D:
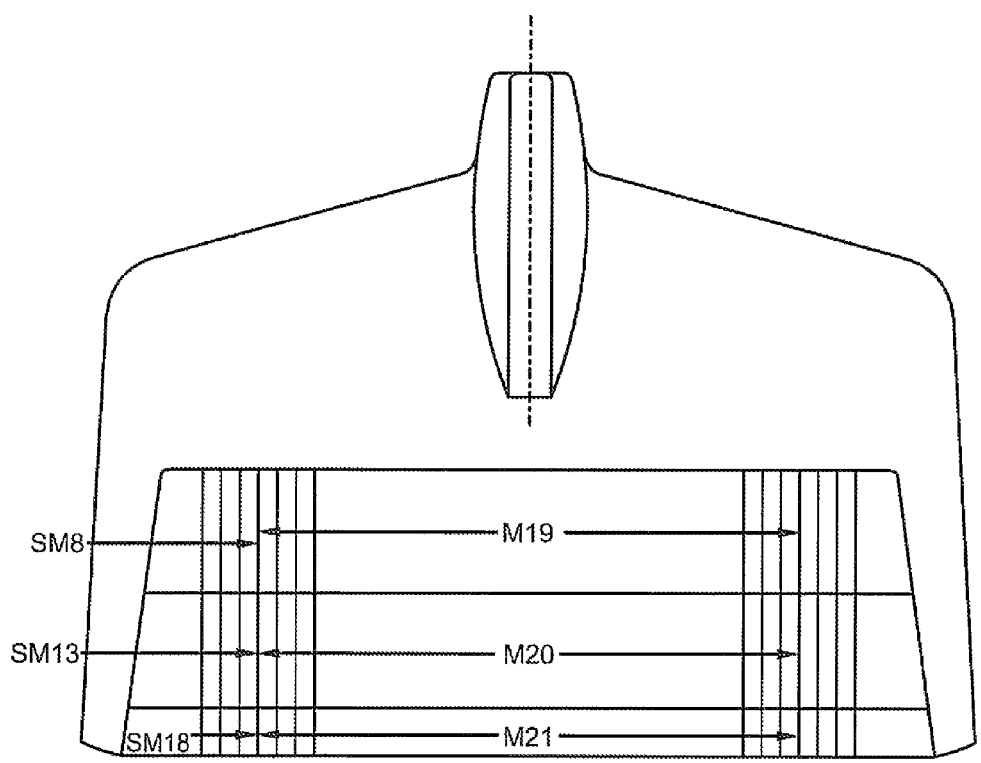
FIG. 4d is an enlarged view of the transom section of the hull plug of FIG. 4 showing the serial numbering of three transom mold modules.
Figure 7:
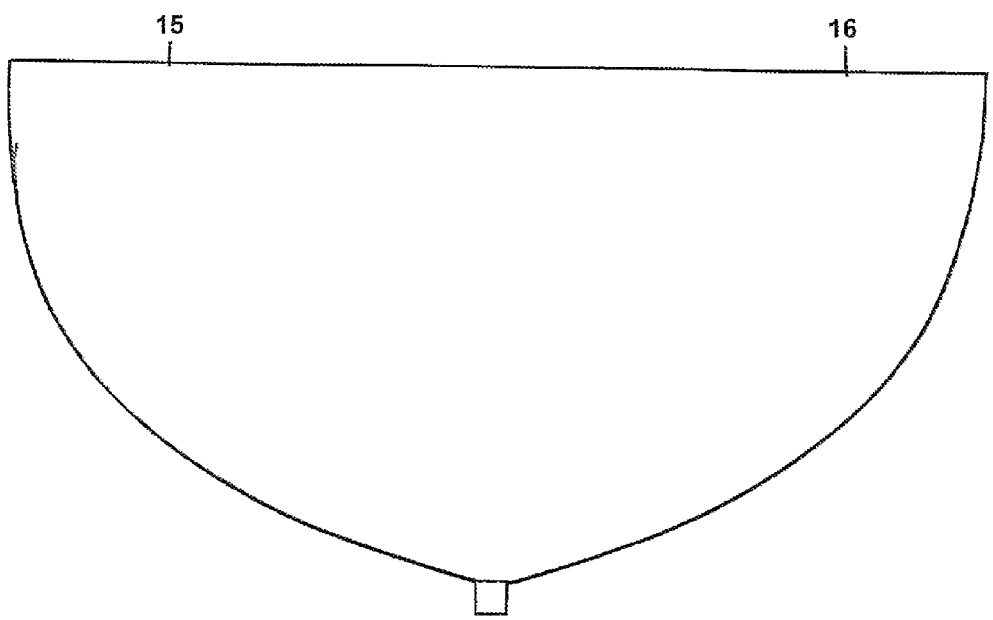
FIG. 7 is a mid-ship cross sectional view of a conventional full displacement hull with standard keel.
Figure 8:
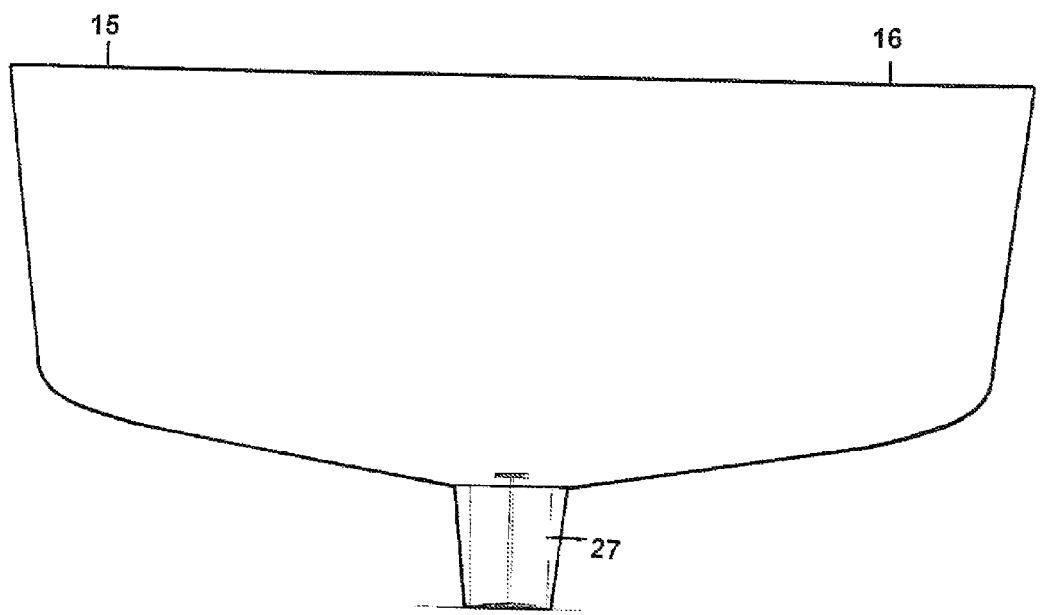
FIG. 8 is a mid-ship cross sectional view of a full displacement hull with a stabilizer keel.
Figure 9A:
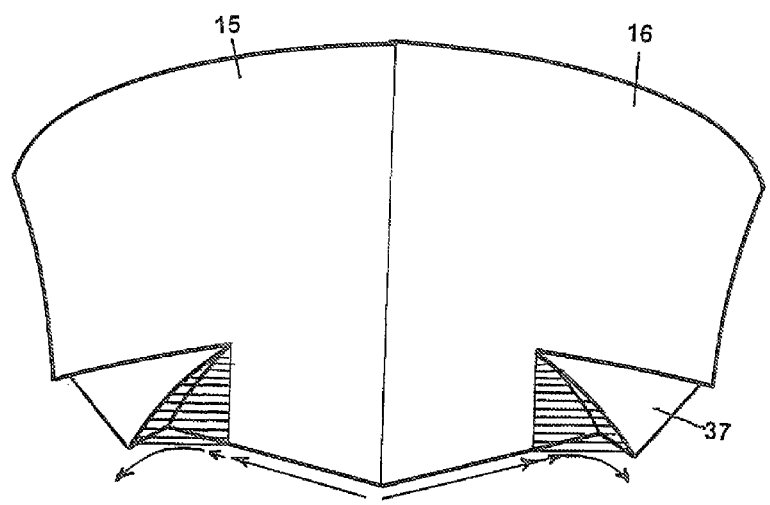
FIG. 9a is a front view of the dual chine stabilizer keel, showing areas of air entrapment with horizontal lines and the downwards deflection of water underneath with arrows.
Figure 9B:
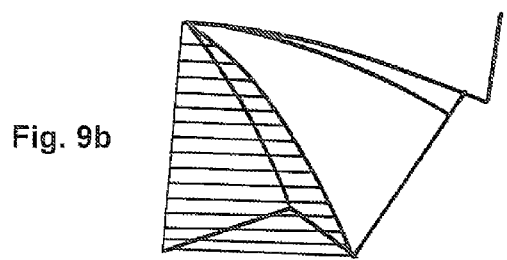
FIG. 9b is an enlarged front view of one of the chine keels, showing areas of air entrapment with horizontal lines.
Figure 9C:
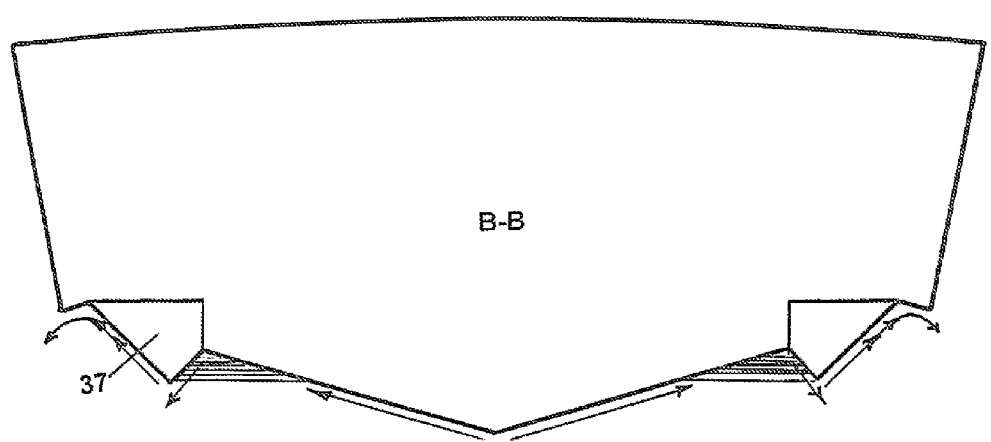
FIG. 9c is a rear view cross section of the dual chine stabilizer keel, showing areas of air entrapment with horizontal lines and the downwards deflection of water underneath with arrows.
Figure 9D:
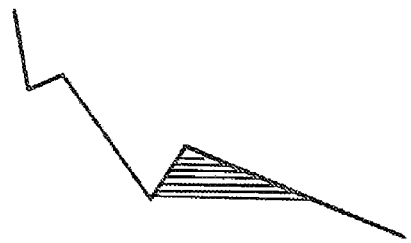
FIG. 9d is an enlarged rear view cross section of one of the chine keels, showing areas of air entrapment with horizontal lines.
Figure 9E:
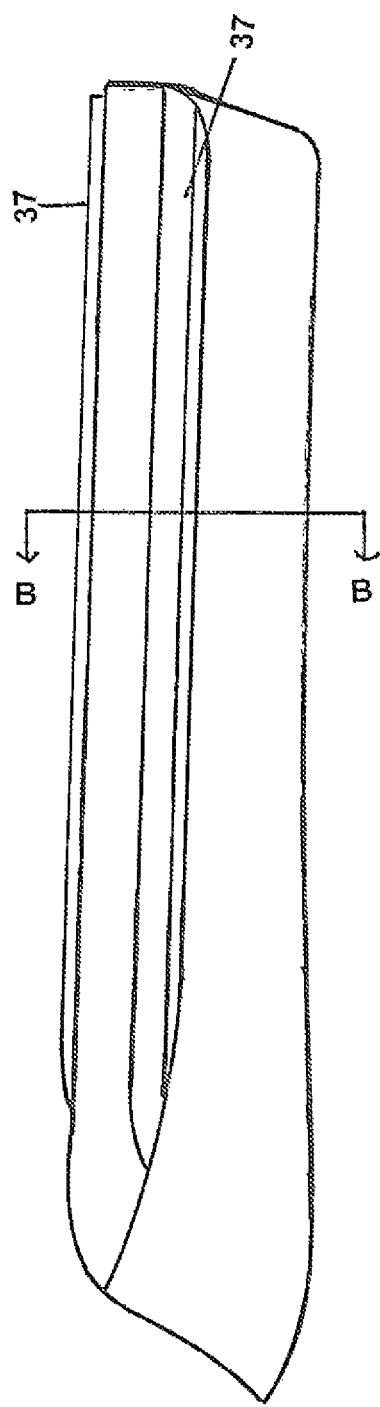
FIG. 9e is a perspective view of a hull with the dual chine stabilizer keel, showing the bottom and starboard side of the hull and showing the cross-sectional location of FIG. 9c.
Figure 10C:
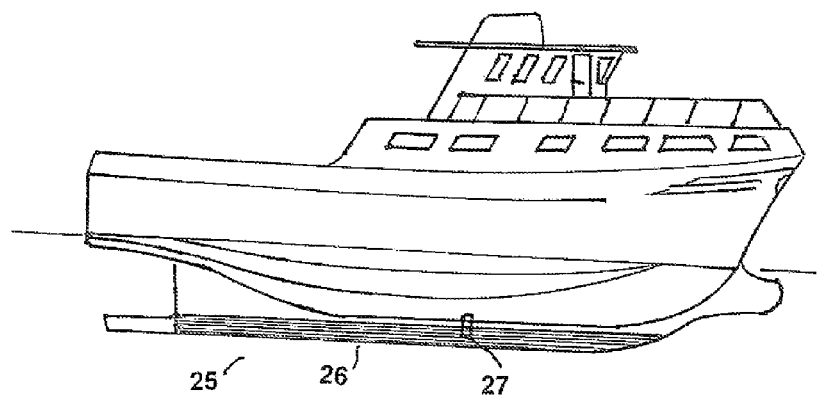
FIG. 10c is a side view of a boat including the stabilizer keel of the present invention, where the boat is at neutral trim.
Figure 10D:
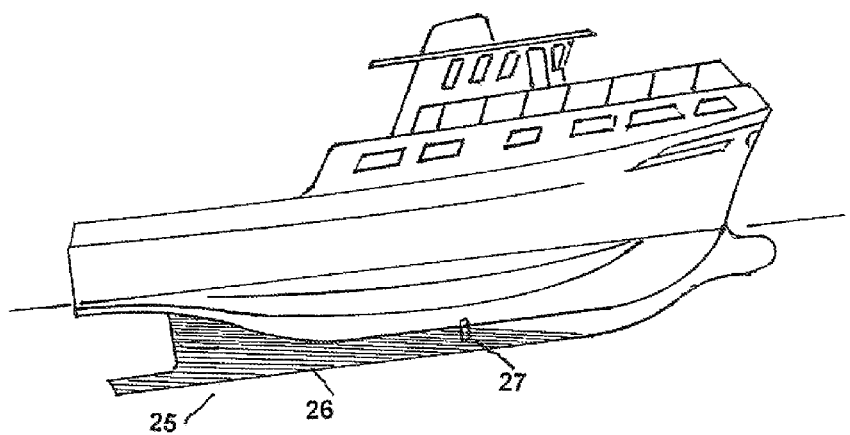
FIG. 10d is a side view of a boat including the stabilizer keel of the present invention, where the boat is pitched upwards.
Figure 10E:
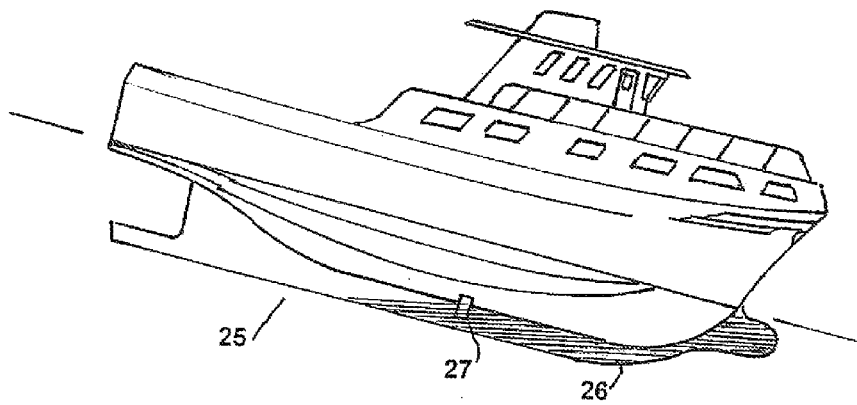
FIG. 10e is a side view of a boat including the stabilizer keel of the present invention, where the boat is pitched downwards.

Looking again at FIG. 4a, it can be seen that the panel for manufacturing a hull consistent with the plug shown and between the edges 12 is curved in nature. Such panels are other than flat. Further, the mold adjustment areas 8 (numbering not shown in FIG. 4a) are also within the non-flat region of said plug. In FIG. 4b, the mold adjustment areas shown in long stripes closely spaced along the bottom of the plug are also disposed within a region of the plug that is shown as other than perfectly flat. Of course some mold adjustment regions may occur where the hull is flat, such as for the bottom of a hull such as is shown in FIG. 8, but the hull of FIG. 7 is absent flat portions for supporting the mold adjustment areas along a bottom thereof.

Clearly, when a panel is formed with a mold absent a mold adjustment area, for example for a portion of the hull shown in FIG. 4a, the hull has a first width and by including the mold adjustment areas in molding a panel for a same location within the hull, a wider hull results. Including the mold adjustment area increases the size of the curved area, as is the case for the mold adjustment areas shown in FIG. 4a. Thus, two identical hulls can be formed using the molded panels with identical mold adjustment areas, but, by including different mold adjustment areas when molding select panels of another hull, a different size hull with a different sized curved portion results. This is clear form an examination of the hull designs shown, for example the plug of FIG. 4 and the hull of FIG. 7.

More notably, such is the case at the front of each of the boat designs shown, wherein adjusting a width of the hull results in adjustments to the curved portion proximate a front of each hull through addition or exclusion of mold adjustment areas when molding individual panels, as described in the specification.

In one embodiment of the invention, the mold module 1 has a substantially rectangular perimeter, the length and width of which selected to facilitate easy transport in shipping crates, and use of the mold modules 1 in a mechanical or hand composite layup procedure. In another embodiment, the mold module 1 has a substantially rectangular perimeter, the length of the substantially rectangular perimeter being less than or equal to approximately 12 meters and the width of the substantially rectangular perimeter being less than or equal to approximately 3 meters.

The mold module 1 of the present invention may be constructed using any method for constructing molds known in the art. Referring to FIGS. 4, 4A, 4B, 4C and 4D, as an illustrative example not intended to be limiting, the mold module 1 is a composite material laid up on a plug 11 in the shape of a boat hull, thereby forming the panel mold 2. The panel mold may include one or more mold adjustment areas 8. The edge mold 3 may be constructed separately from this procedure and placed on or attached to the panel mold 2 in a later step. In the construction of each mold module 1, a flange 10 may be formed as part of the mold module 1 by extending the mold module material into the adjacent area surrounding the mold module 1 on the plug 11. Each mold module 1 may preferably be constructed on separate portions of the plug 11 such that a set of mold modules create hull parts 20 which form the hull of a boat 14. Multiple mold modules 1 can be laid up simultaneously or at distinct times on the plug 11.

Figure 5:
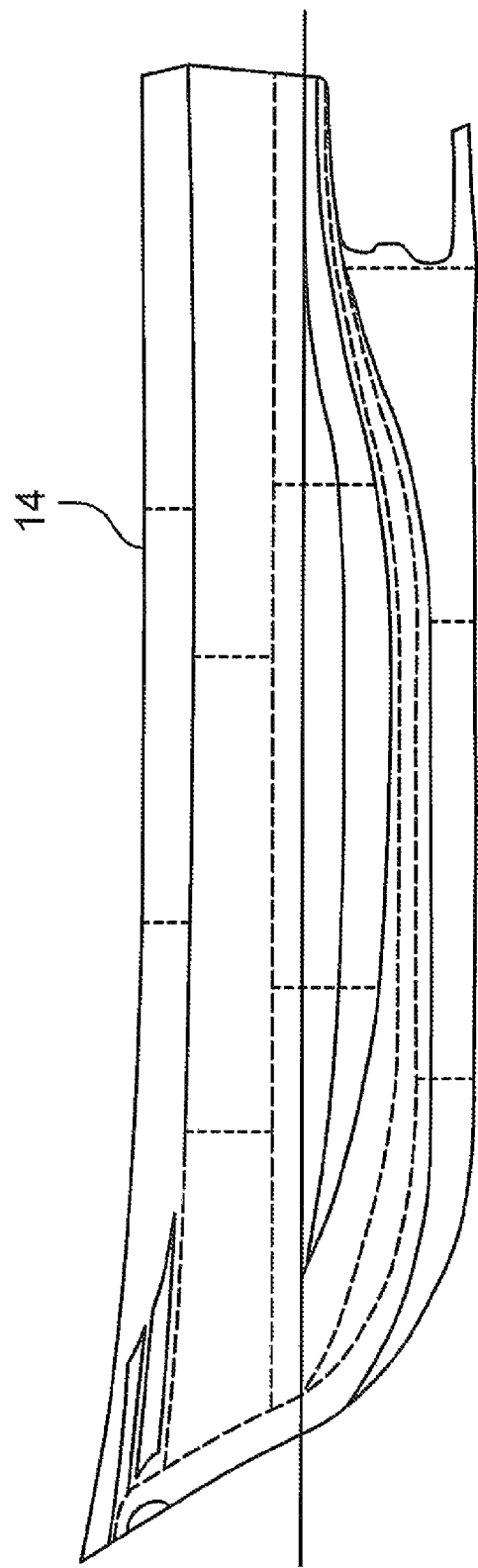
FIG. 5 is a side view of the hull of a boat constructed from multiple hull parts.
Figure 6:
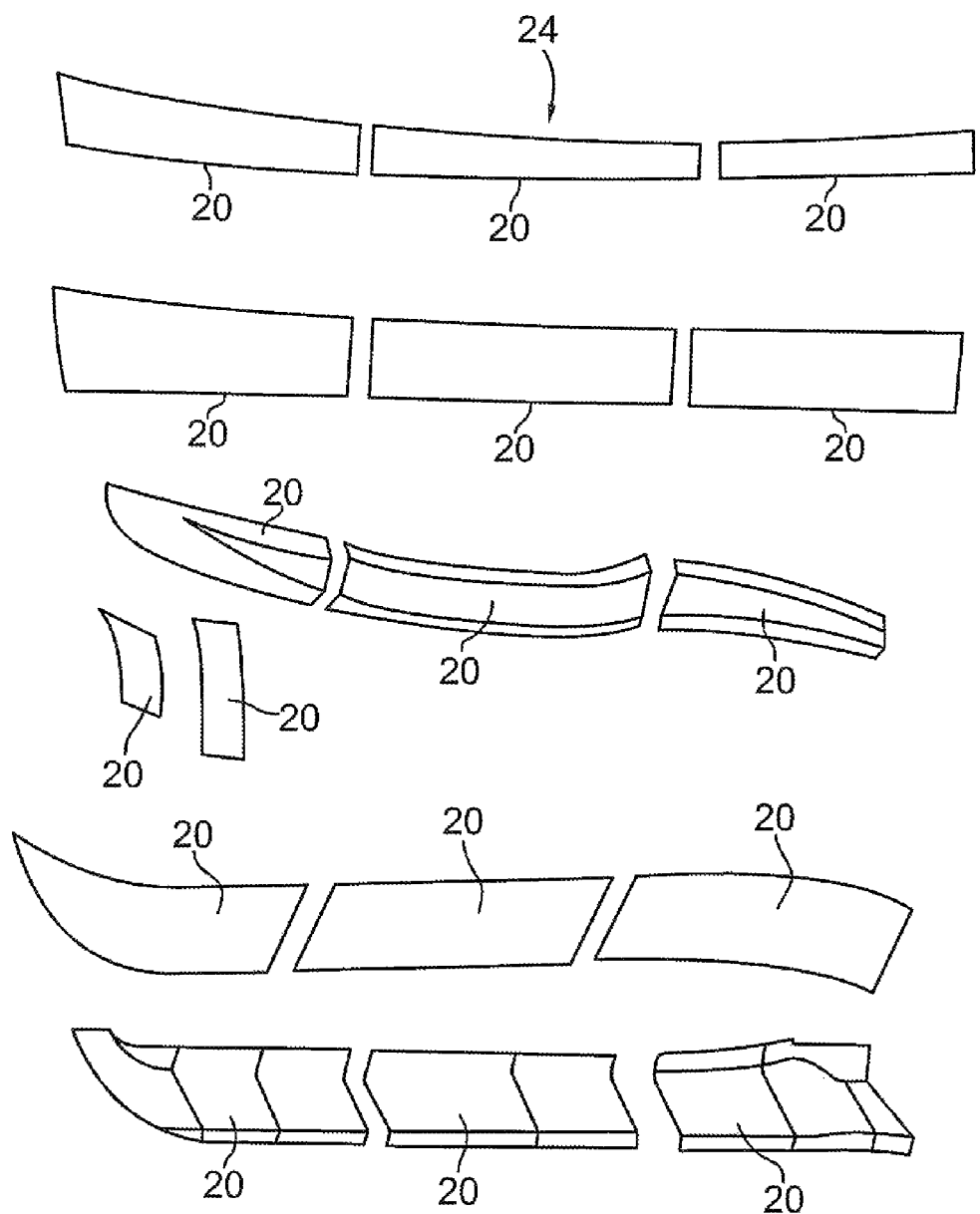
FIG. 6 is the illustrative exploded view of some of the hull parts used to construct the boat hull in FIG. 5.

The mold module 1 of the present invention may be included with others to form a kit 24. An exemplary embodiment of a collection of hull parts 20 made with such a kit is shown in FIG. 6, where these hull parts 20 are for constructing the hull of a boat, such as the exemplary hull shown in FIG. 5. It will be appreciated by those skilled in the art that FIG. 5 and FIG. 6 are for illustrative purposes only and are not to scale. The kit 24 should preferably include at least a set of mold modules 1 sufficient to form the complete hull of a boat; however, the kit 24 may include a set of mold modules 1 sufficient to form only an incomplete portion of the hull of a boat. The latter may be advantageous, for instance, when there is a need for a kit 24 of replacement mold modules 1 for replacing a number of broken, worn, old or otherwise poorly functioning mold modules 1. When using the mold modules 1 in the kit 24 together to form the hull of a boat 14, the settings on the calibrators 9 of the mold modules 1 should be selected in agreement with one another, such that each mold module 1 creates a portion of a hull of a boat of the same dimensions. FIG. 19 shows 3 differently dimensioned hulls that may be constructed from the same kit 24 by selecting different calibrator 9 settings. Referring to FIG. 4, in order to construct a kit 24 of mold modules 1 using the exemplary aforementioned mold module construction process, the hull plug 11 may include module boundary markings 12. These module boundary markings 12 denote the boundaries of the panel mold 2 and mold adjustment area 8 of each mold module 1 in a given kit 24. Preferably, these markings also include an identifier 13 of the mold module 1 created on the section of the plug 11 denoted by the boundary markings 12. This identifier 13 may be transferred to the mold module 1 during its construction or afterwards, and is used to assist in later aligning the hull parts 20 made using the kit 24. Note however, that the aforementioned method of constructing a kit 24 of mold modules 1 is merely didactic and not intended to be limiting.

The present invention also provides the hull of a boat 14, generally shown in FIGS. 7, 8, and 9. The hull 14 has at least a port portion 15 and starboard portion 16. Each portion 15, 16 is constructed from multiple hull parts 20, each formed by a mold module 1. In one embodiment of the invention, the hull parts 20 are attached to each other to form each portion 15, 16 of the hull, and the portions 15, 16 of the hull are attached to each other to form the hull 14. In another embodiment, the hull parts 20 are attached to each other to form the hull 14 directly. In an embodiment of the invention, the mold modules 1 that were used in the construction of the hull 14 were part of a kit 24 as described previously. The hull 14 of the present invention may be of many shapes and sizes, including but not limited to full displacement, semi-displacement, light displacement, planning and multi-hull, swath-hull and submarine hull form. Further, the hull 14 of the present invention may include a keel of any shape known in the art.

Figure 11A:
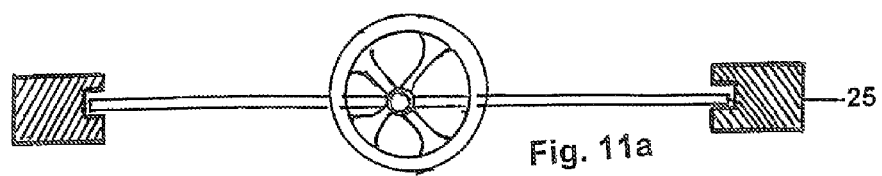
FIG. 11a is a top view of a valve type fluid controller in one embodiment of the stabilizer keel of the present invention.
Figure 11B:
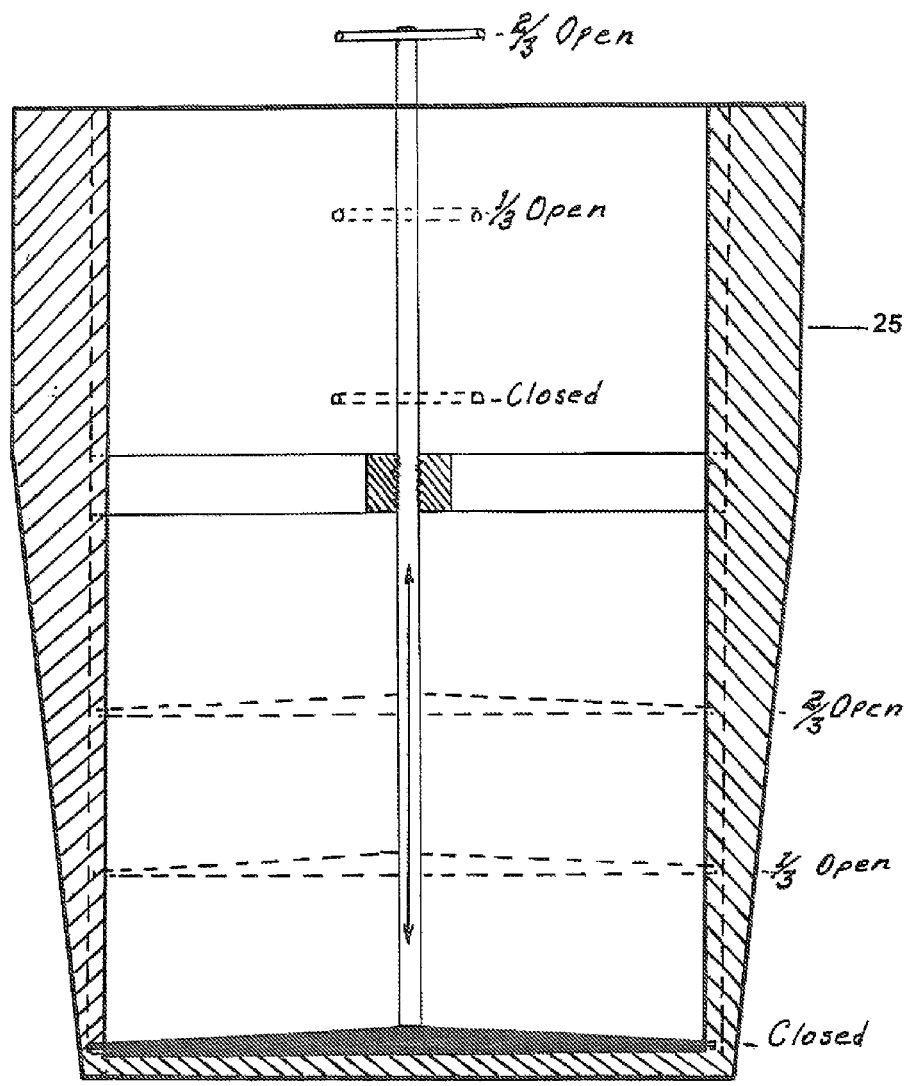
FIG. 11b is a cross sectional view of a valve type fluid controller in one embodiment of the stabilizer keel of the present invention, showing the valve closed, a third open, and two thirds open.

This keel may be a stabilizer keel 25, shown in FIGS. 10*a-e*. This stabilizer keel 25 comprises a hollow keel containing ballast 26 and a fluid controller 27, for example the valve seen in FIGS. 11*a* and 11*b*. When ballast 26 flows in the stabilizer keel 25 due to the pitching motion of the craft, the fluid controller 27 acts to control the motion of the ballast 26 such that the pitching motions are damped. In a preferable embodiment of the invention, if the bow of the hull is lower than the aft portion, the fluid controller 27 controls the ballast 26 such that it moves towards the bow at a pre-selected rate, thereby slowing the hull's return motion; similarly in this embodiment, if the aft portion is lower, fluid controller 27 controls the ballast 26 such that it moves towards the aft portion at a pre-selected rate. The fluid controller 27 may be operated manually or electrically, and may or may not be controlled autonomously with sensors preferably a seastate sensor and a processing means. Further, in some embodiments, the fluid controller 27 actively controls the ballast 26, such as in the case of a pump, a water thrusters or water jet, or any other device which actively controls the flow of the fluid ballast. In other embodiments, the fluid controller 27 passively controls the ballast 26, such as in the case of a valve shown in FIGS. 11*a* and 11*b*, or a plurality of baffle bulkheads 38 installed across the keel at regular intervals. Alternatively a combination of the active controls, passive controls or active and passive controls may be used. The stabilizer keel, an embodiment of which is disclosed here, substantially slows the pitch action of the vessel. The stabilizer keel creates a seakindly platform which uses less horsepower and fuel for a given speed.

Further, the keel of the present invention may take the form of a dual chine stabilizer keel, shown in FIG. 9, comprising a sealed, hollow, longitudinal compartment on the port and starboard chine area, running in a fore and aft direction of the hull, containing fluid ballast 26 in a partly filled condition that acts in unison to modulate the longitudinal pitch action of the hull in the same manner as the single stabilizer keel version in FIGS. 10*a-e*. In the embodiment of the invention shown in FIGS. 9*a*, 9*b* and 9*c*, the chine keels 37 are generally triangular in shape. The dual chine stabilizer keel may comprise the active or passive fluid controller 27 described previously. In addition to damping pitching motion, the exterior shape of the chine keels 37 provide passive cross roll reduction resulting in a more seakindly platform. The shape of the chine keels 37 forces the upward flow of the trough water to be diverted in a downward direction starting at the center of the hull when it intersects the inner wall of the chine keel 37. This downward action of the water gives an opposite action resulting in lift, thus reducing the wetted surface of the hull resulting in reduced resistance giving improved fuel/horsepower efficiency for a given speed. The dual chine stablizer keel enables the use of a lesser hull draft without sacrificing the stablility benefits of a deep draft hull. The shape of the chine keels of the present invention may also allow air entrapment resulting in air lubrication of the hull bottom. Air enters the front of the hull above the water line and travels the full length of the hull bottom prior to escape at the transom. This entrapped air provides a cushioning effect contributing to a more sea kindly platform as well as reducing fuel consumption to achieve a given speed at a given a horsepower. Persons skilled in the art will appreciate that the chine keels 37 of the present invention may be of any shape which achieves the aforementioned air entrapment, cross roll reduction and lift effects.

Figure 20:
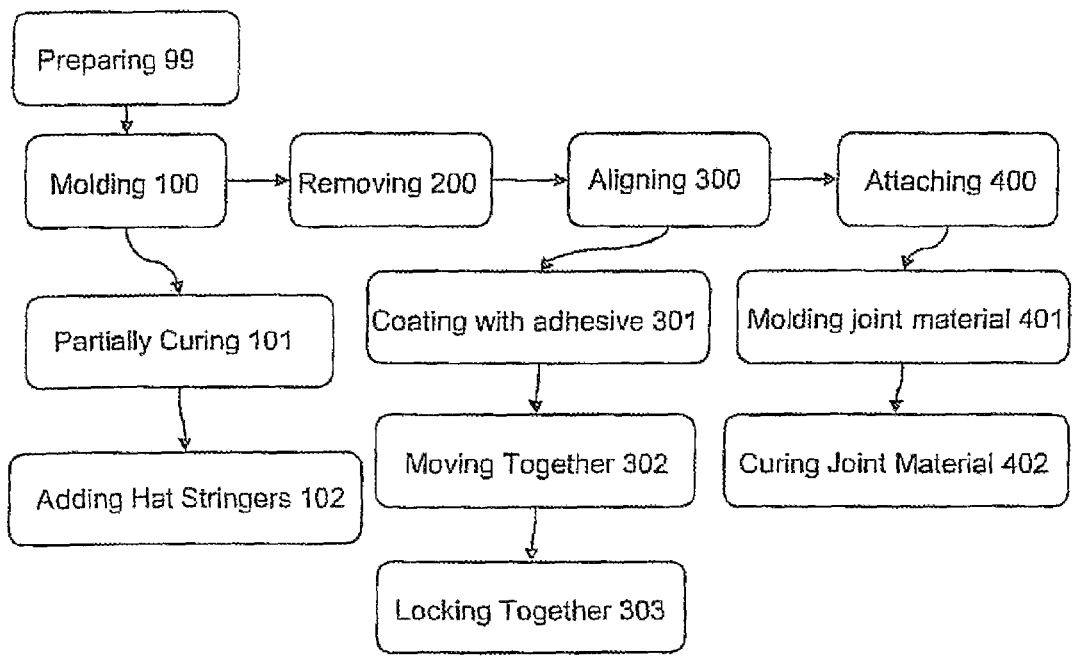
FIG. 20 is a flowchart of the hull construction process.

The present invention also provides methods of constructing boat hulls using the aforementioned mold modules 1 and mold module kits 24, as discussed hereinafter and represented by the flowchart of FIG. 20.

The first step 100 of constructing a boat hull 14 according to the present invention generally includes molding 100 hull material in a mold module 1 and at least partially curing 101 the hull material to form a hull part 20. Preferably, prior to molding hull material in the mold module 1, the mold module 1 is prepared 99. Preparing 99 the mold module 1 involves adjusting to select the size of the hull 14 formed partially by the hull part 20, and in addition a layer of gel-coat may be applied to the mold module 1 which waterproofs the hull part 20. Further, preferably the hull material is cured 101 enough such that the hull part 20 will retain its shape upon removal 200 from the mold module 1, but is not cured 101 too much such that other objects or hull parts 20 may still be attached 400 to the hull part 20 easily. Multiple mold modules 1 may be butt-joined to one another before molding 100 such that fewer hull parts 20 are created and need to be attached 400 to form the boat hull 14.

In an embodiment of the invention, adjusting the mold module 1 comprises moving at least one movable edge mold 3 within an adjustment area 8 on the mold module 1. In a further embodiment of the invention, the movable edge molds 3 are moved such that they form the complete or incomplete perimeter of the hull part 20. In an exemplary embodiment of the invention, 3 or 4 movable edge mold bars 3 are moved such that they form a complete or incomplete rectangular perimeter of a hull part 20. In embodiments wherein the adjusting step comprises moving at least one movable edge mold 3, preferably the molding 100 step includes molding hull material in the movable edge mold 3.

The molding step 100, in one embodiment of the invention, forms the male 34 or female 35 key-lock surface and a taper 17 at a portion of the boundary of the hull part 20, shown in FIGS. 12-15. One method of achieving this taper, when molding 100 a composite material, is by laying up smaller and smaller amounts of hull material at each layup step once the key-lock surface has been molded, shown in FIG. 15. This taper 17 is useful during the attaching step 400, as described hereinafter.

The hull material used in the molding step 100 may be any material known in the art suitable for use in a mold. This material may include, but is not limited to, solid glass, cored (sandwich) construction, Kevlar, carbon fibre, and combination thereof.

The molding step 100 may be any molding technique known in the art. This step may include, but is not limited to, hand layup, mechanical layup, vacuum bagging, resin infusion, vacuum assisted resin infusion, closed molding system, high-tech prepreg layup, filament winding, ceramic molding and metal castings and combination thereof. Further, the molding step 100 may include application of a wax or release agent to the mold such that the hull part 20 is easily removed 200 from the mold module 1 after at least partially curing 101.

Figure 16:
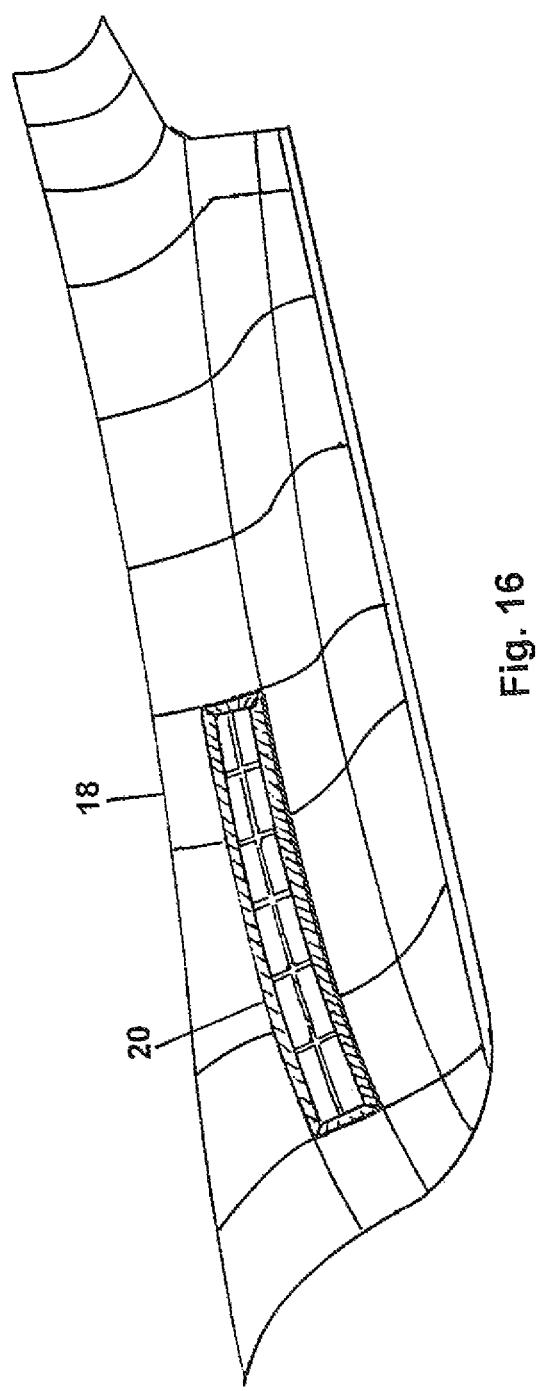
FIG. 16 is an embodiment of a jig of the present invention, including one hull part supported by the jig.

The second step 200 of constructing a boat hull 14 according to the present invention generally includes removing the at least partially cured hull part 20 from the mold module 1 and placing the hull part 20 in an alignment jig 18, shown in FIG. 14. In one embodiment of the invention, hat stringers 19 are attached 102 to the hull part 20 prior to removal 200 from the mold module 1, shown in FIGS. 13 and 14. These hat stringers 19 strengthen the hull, and also facilitate the removal 200 of the hull part 20 from the mold module 1 such that there is a minimum likelihood that the hull part 20 is damaged. Hat stringers 19 may be longitudinal and lateral throughout the interior of the hull lay-up. Hat stringers 19 provide strength and stiffness to the hull. Hat stringers may also be included at the joints between modules. A module lifting clamp and hoisting system 36 may be used to remove 200 the hull part 20 from the mold module 1 and to feed it to the alignment jig 18. The alignment jig 18 shown in FIG. 16 is preferably adjustable, to facilitate the alignment of multiple boat hull part 20 sizes created using the mold modules 1.

Figure 12:
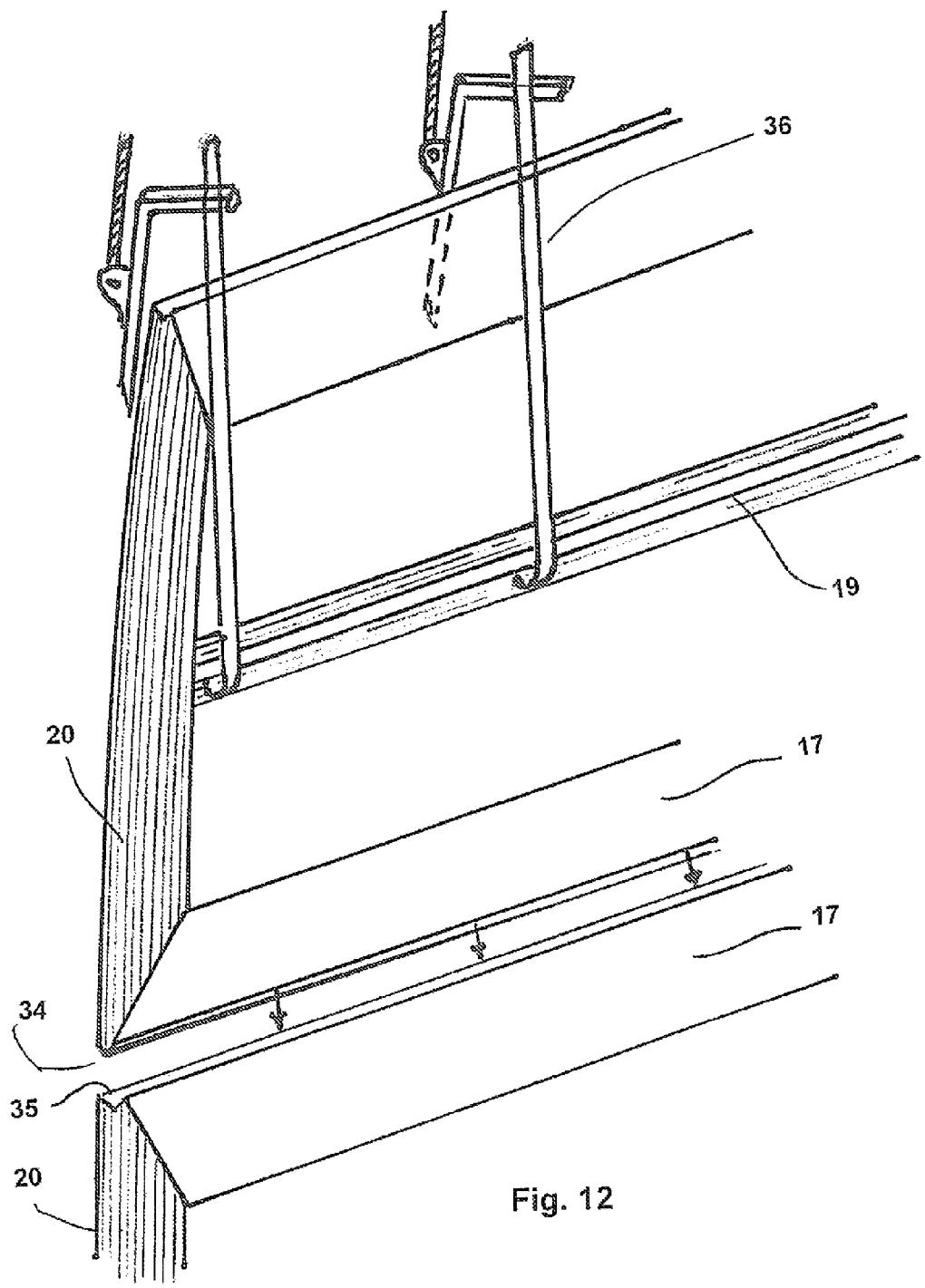
FIG. 12 shows the hull part having been removed from the mold module by a lifting clamp, and about to be placed in alignment with another hull part.
Figure 17:
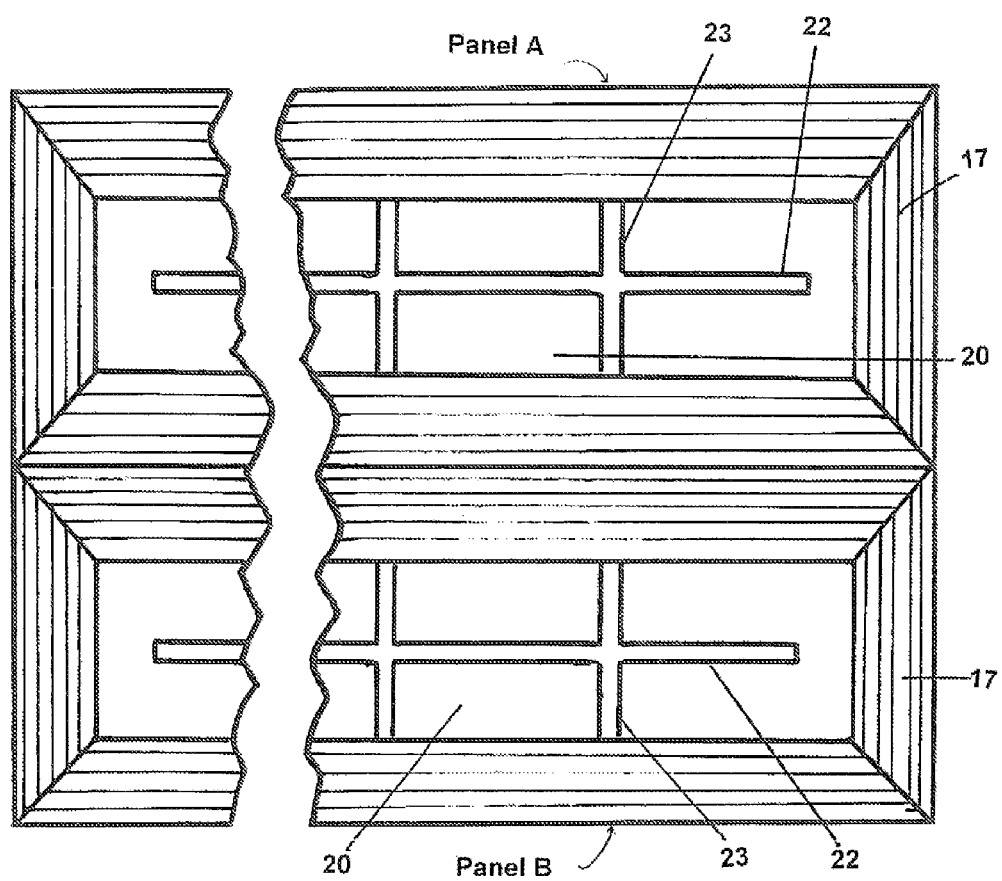
FIG. 17 is a plan view of two hull parts being aligned to one another.
Figure 18:
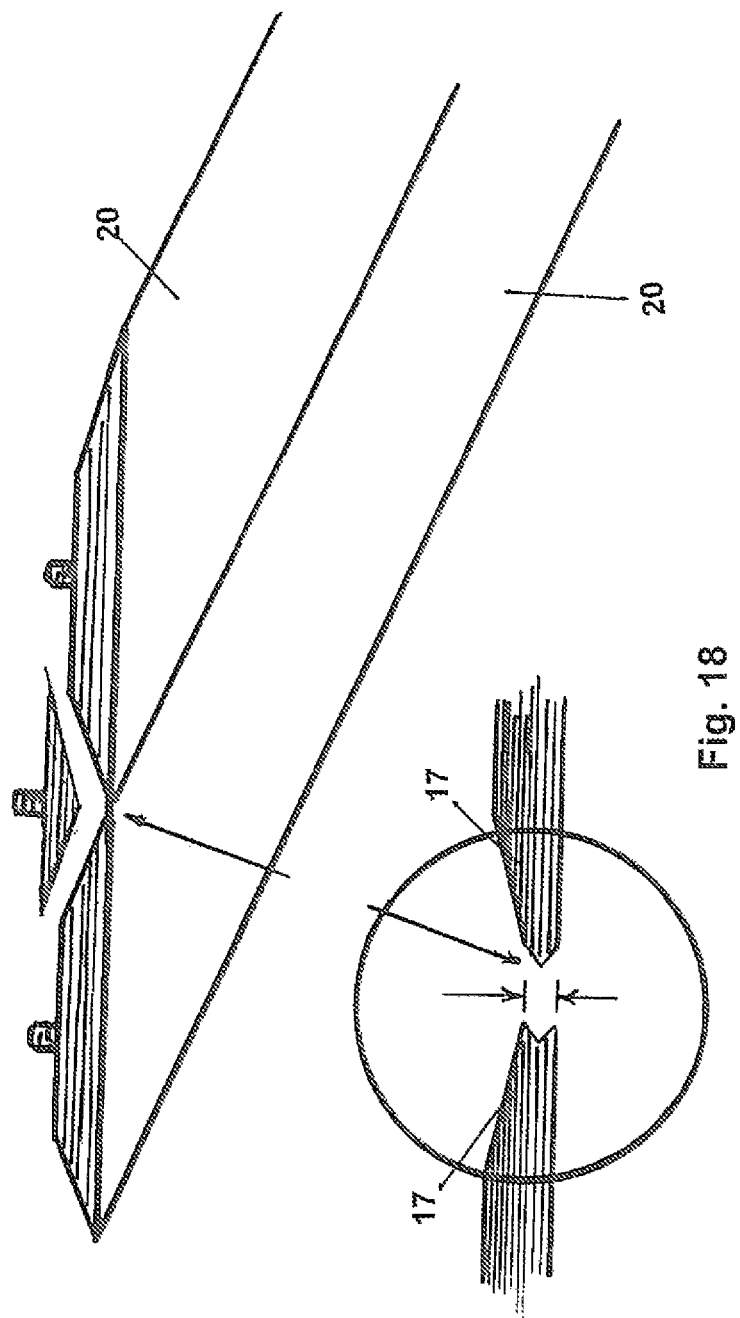
FIG. 18 is a perspective view of two hull parts being aligned to one another.

The third step 300 of constructing a boat hull 14 according to the present invention generally includes aligning a plurality of hull parts 20, shown in FIGS. 12, 17 and 18. In an embodiment of the invention, aligning 300 the hull parts 20 includes applying 301 an adhesive, such as but not limited to a gelcoat, to a portion of each hull part 20, and moving 302 the hull parts 20 together such that the portions with applied 301 adhesive contact. Preferably, the portion of each hull part 20 which has adhesive applied thereto is the key-lock surfaces 4. In another embodiment of the invention, the hull parts 20 contact each other at their edges and fit in registration with one another, their edges having been molded by an edge mold 3. Another method of alignment 300 includes locking 303 hull parts 20 together with magnetic clamping devices. The aforementioned alignment methods are merely didactic and not intended to be limiting.

The fourth step 400 of constructing a boat hull according to the present invention generally includes attaching the plurality of hull parts 20 together to form a hull. One embodiment of the results of this step is shown in FIGS. 13-15. In one embodiment of the invention, attaching 400 includes molding 401 joint material 21 such that it contacts multiple hull parts 20, and curing 402 the joint material. In an embodiment, the joint material 21 is molded 401 in the valley formed by two tapers 17 on the boundaries of two hull parts 20, and cured 402. The attaching step 400 may be completed in multiple stages and at multiple locations, such as when portions of a boat hull 14 are attached 400 and shipped elsewhere before finishing the attaching 400. A hat stringer may be placed behind the joints between hull parts 20.

The joint material 21 used in the molding step 401 may be any material known in the art suitable for use in a mold. This material may include, but is not limited to, solid glass, cored (sandwich) construction, Kevlar, carbon fibre, ceramics, composite casting, metal casting, and combination thereof.

The molding step 401 may be any molding technique known in the art. This step may include, but is not limited to, hand layup, mechanical layup, vacuum bagging, resin infusion, vacuum assisted resin infusion, closed molding system, high-tech prepreg layup, filament winding, ceramic molding, metal and composite joinery techniques and combination thereof.

Preferably, all of the hull parts 20 for the boat are molded 100, removed 200, aligned 300, and attached 400 in a sequence and time span that guarantees primary bonding between the parts 20. In an exemplary composite attachment 400 procedure, hull parts 20 should preferably be attached 400 within the primary bonding time limits of the resins, adhesives and other bonding agents used.

In the method of constructing a boat hull according to the present invention, additional steps related to hull manufacture may be included. For instance, longitudinal and lateral stiffeners 22, 23 as shown in FIG. 17 may be included in the boat hull 14, and exterior cosmetic seam treatments to achieve a commercial or yacht quality finish may be applied. The mold modules 1, mold module kits 24 and boat hull construction processes provide significant advantages over conventional boat hull molding techniques. The mold modules 1 themselves are small, lightweight, and can be stacked, causing them to be easy to transport, take little room in storage and be inexpensive to construct and replace. Unlike conventional boat hull construction techniques, the method of the present invention can be undertaken at work bench level. This simplifies the process, and during composite hull construction, eliminates resin drainage due to the vertical surface nature of conventional boat hull molds which results in resin rich and resin lean areas that weaken the laminate. The method of the present invention can also be enacted by many workers in parallel, leading to faster hull construction. Further, when one set of hull parts 20 has been partially completed, previously used mold modules 1 may be used again to start the construction of another boat hull 14 of a different size simultaneously, because they may be individually adjusted.

The following example relating to the construction of a composite hull is presented to enable those skilled in the art to understand and to practice the present invention. It should not be considered as a limitation on the scope of the invention, but merely as being illustrative and representative thereof.

With reference to FIG. 4, a starboard side view of a full displacement hull plug 11 and enlarged views of the four sections are used to illustrate the invention. This exemplary kit 24 consists of 22 mold modules 1 used to construct the starboard side of the boat hull 14, as marked on the displayed starboard surface of the hull plug 11. The port side portion of the kit 24 is a mirror image consisting of 22 mold modules 1. The transom portion of the kit 24 contains 3 mold modules 1 as shown in FIG. 4d. The port, starboard and transom make up a total of 47 mold modules 1 that makes up the mold module kit 24. In order to meet the size requirements of standard international shipping containers and to accommodate lay-up technicians reaching to the middle of the panel mold 2 with ease, a girth of 2.27 meters and a length of 11.9 meters are selected for most of the rectangular and rectangular like modules 1. The hull part 20 itself created by these mold modules 1 has a girth of 2 meters and a length of 12 meters.

The 22 mold module hull plug 11 shown in FIG. 4 is numbered in order to assist with organizing a mold set. Starting at the keel and working towards the sheer-line, there are five horizontal levels of rectangular module plug regions. The first level, proceeding from right to left, are modules SM1 to SM3 forming the keel and part of the hull bottom. The next level of four modules, SM4 to SM7 form more of the hull bottom and include a hull width adjustment area 8, running horizontal on the bottom edge of the modules. The third level contains modules SM8 to SM12, and includes the adjacent width adjustment area 8. Note that modules SM11 and SM12 each have two separate width adjustment areas 8. The fourth level of modules comprises a longitudinal series of five modules starting with SM13 to SM17. Modules SM16 and SM17 have a width adjustment area 8, while SM13, SM14 and SM 15 have length adjustment areas 8. Finally, the last level of modules is at the sheer-line and contains modules SM18 to SM22. Modules SM21 and SM22 have a width adjustment area 8. Modules SM18, SM19 and SM20 contain length adjustment areas 8. For enlarged views of three sections of this plug, see FIGS. 4*a*, 4*b* 4*c*, and 4*d*.

As described previously, some modules 1 may have multiple adjustment areas 8. For instance, modules SM4 to SM7 and SM9 to SM 11 have both length and width adjustment areas 8. As another example, SM11 has length adjustment and dual width adjustment areas 8, one associated with the horizontal plane and the other two on the vertical plane.

Each of the modules 1 have a calibrator 9 with registration marks permanently etched on their flange 10 at 5 ft. and 1 ft. intervals, marked to indicate the length, width, and depth of the hull which will be produced by laying up to this specific registration mark for all mold modules 1 in the set. For example, to construct a 65 ft. length, 24 ft. width and 12 ft. depth hull, the layup of all mid-body mold modules ends on the 65 ft. registration mark. To achieve a specific hull width, for example, 24 ft., all mold modules are laid up to the 24 ft. width registration mark except those that do not have width adjustability. To achieve a specific depth, for example 12 ft., the mold modules at the keel and or sheer line are marked by the builder to give the 12 ft. depth. All three dimensions can be adjusted independently to meet the builder's hull size requirements. A 120 ft. (the maximum length in this particular mold set) hull is achieved by using all modules to the full extent of their lay-up area (i.e., up to the 120 ft. registration mark).

When constructing a hull 14 from mold modules 1 created from a plug 11 such as the one in FIG. 1, mold modules 1 in the mid body section can be butt joined to lay-up longer parts in one piece. This means that the number of hull parts 20, and therefore the complexity of the joinery of individual hull parts 20, can be substantially reduced. For instance, in the construction of a 120 ft. hull, a number of mold modules 1 may be placed in series and joined together for layup to produce a single, elongated hull part 20.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

What is claimed as the invention is:

1. A kit comprising:
   a first adjustable panel mold for in a first adjusted position forming from a moldable material a first curved portion of a first hull and for in a second different adjusted position forming from the moldable material a second curved portion of a second hull, and dimensions of the first curved portion different than dimensions of the second curved portion such that the first hull of different dimensions than the second hull; and
   a second panel mold for forming from the moldable material a third curved portion of the first hull and a fourth curved portion of the second hull, the third curved portion for aligning with and smoothly transitioning from the first curved portion for being attached thereto and the fourth curved portion for aligning with and smoothly transitioning from the second curved portion for being attached thereto.

2. The kit according to claim 1 wherein the first adjustable panel mold comprises a first adjustable element for adjusting an area of the first adjustable panel mold for molding the moldable material, the first adjustable element in the first adjusted position for forming the first curved portion and in the second adjusted position for forming the second curved portion, the dimensions of the first curved portion and second curved portion dependent upon adjustment of the first adjustable element, a first portion of the first curved portion and the second curved portion molded within a same area of the first adjustable panel mold.

3. The kit according to claim 2 wherein the first adjustable panel mold when adjusted from the first adjusted position to the second adjusted position comprises a cavity having at least one common surface and is for forming a first surface of the first curved portion and for forming a second surface of the second curved portion, a second portion of the first surface and of the second surface molded within a same area of the at least one common surface of the first adjustable panel mold.

4. The kit according to claim 3 wherein dimensions of the first surface differ from dimensions of the second surface in dependence upon adjustment of the first adjustable element.

5. The kit according to claim 2 wherein the first adjusted position of the first adjustable element depends on the dimensions of the first hull and the second adjusted position depends on the dimensions of the second hull.

6. The kit according to claim 2 wherein the first adjustable panel mold comprises a first surface having a consistent length and width for the moldable material being molded therein.

7. The kit according to claim 6 wherein the first adjustable element adjusts to modify the width of the first surface.

8. The kit according to claim 7 wherein the first adjustable element adjusts to modify the length of the first surface.

9. The kit according to claim 1 wherein the second panel mold is fixed in size.

10. The kit according to claim 1 wherein the second panel mold is adjustable and comprises a second adjustable element for in a first position molding the third curved portion having third dimensions and for in a second other position molding the fourth curved portion having fourth dimensions, the third dimensions and the fourth dimensions dependent upon adjustment of the second adjustable element, a first portion of the third curved portion and the fourth curved portion molded within a same area of the second adjustable panel mold.

11. The kit according to claim 10 wherein the second panel mold comprises a first surface portion for containing the moldable material for forming a third surface of the third curved portion and a fourth surface of the fourth curved portion a portion of the third surface and a portion of the fourth surface molded against the first surface portion of the second panel mold.

12. The kit according to claim 11 wherein dimensions of the third surface differ from dimensions of the fourth surface, the dimensions of the third surface and the dimensions of the fourth surface dependent upon a position of the second adjustable element, a third portion of the third surface and the fourth surface molded within a same area of the second adjustable panel mold.

13. The kit according to claim 6 wherein the first adjustable panel mold comprises a second surface accommodating a consistent length and width for the molded material for being molded therein.

14. The kit according to claim 13 wherein the width and length of the first surface of the first adjustable panel mold and a second surface of the second panel mold are same, a contour of the first surface and a contour of the second surface different.

15. The kit according to claim 13 wherein the second panel mold forms a third edge of the third curved portion having a curved contour and the first adjustable panel mold forms a first edge of the first curved portion having a same curved contour for aligning the first curved portion with and smoothly transitioning from the third curved portion for being attached thereto.

16. The kit according to claim 1 claim wherein the first adjustable panel mold is adjustable for use in manufacturing hulls of selectable width and comprising a third adjustable panel mold for adjusting a length of a bow of a specified hull to allow sides of the bow to extend out sufficiently to mate with the adjusted sides of the specified hull at a selected width.

17. The kit according to claim 1 wherein the first adjustable panel mold is adjustable for use in manufacturing hulls of selectable size and comprising a third adjustable panel mold for being adjusted in step with the first adjustable panel mold wherein both the first curved portion molded using the first adjustable panel mold and a fifth curved portion molded using the third adjustable panel mold are adjusted similarly wherein an edge between them is adjusted on each of the molds for being mated one to another.

\* \* \* \* \*